US007127156B1

(12) United States Patent
Togashi et al.

(10) Patent No.: US 7,127,156 B1
(45) Date of Patent: Oct. 24, 2006

(54) RECORDING APPARATUS AND METHOD

(75) Inventors: Haruo Togashi, Kanagawa (JP); Akira Sugiyama, Kanagawa (JP); Shin Todo, Kanagawa (JP); Hideyuki Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 1170 days.

(21) Appl. No.: 09/890,498

(22) PCT Filed: Dec. 1, 2000

(86) PCT No.: PCT/JP00/08509

§ 371 (c)(1),
(2), (4) Date: Jul. 31, 2001

(87) PCT Pub. No.: WO01/41435

PCT Pub. Date: Jun. 7, 2001

(30) Foreign Application Priority Data

Dec. 2, 1999 (JP) .................. 11/343375

(51) Int. Cl.
*H04N 7/26* (2006.01)
(52) U.S. Cl. ...................... 386/112; 386/111
(58) Field of Classification Search .............. 386/1, 386/27, 33, 38, 68, 109, 111, 112, 117; 360/10.1, 360/10.3, 32, 33.1; 348/231–233, 384, 390, 348/391, 396, 399, 405, 426; 358/310–312, 358/530; 345/530, 555, 545–549; 707/100, 707/101, 200
See application file for complete search history.

(56) References Cited

U.S. PATENT DOCUMENTS 5,701,386 A * 12/1997 Yoneyama .................. 386/109
6,426,771 B1 * 7/2002 Kosugi ..................... 348/222.1

FOREIGN PATENT DOCUMENTS

| EP | 0 724 361 | 7/1996 |
| JP | 5-199495 | 8/1993 |
| JP | 7-250331 | 9/1995 |
| JP | 8-279987 | 10/1996 |
| WO | WO 99 09747 | 2/1999 |

* cited by examiner

*Primary Examiner*—Thai Tran
*Assistant Examiner*—Mishawn Dunn
(74) *Attorney, Agent, or Firm*—Frommer Lawrence & Haug LLP; William S. Frommer; Thomas F. Presson

(57) ABSTRACT

The header of the sequence layer of an input sequence is written to a RAM. Information of a typical header is pre-stored to a ROM. The selecting operation of a selector is controlled by an output of a detecting portion. When the input sequence contains the header of the sequence layer, the selector selects as an output stream the stream of which the header has been added to each frame. In contrast, when the stream does not contain the header, the header stored in the RAM or the ROM is added to each frame of the stream. In this case, the header stored in the RAM is added to each frame with higher priority than the header stored in the ROM. The header has been always added to each frame of a stream that is output from the selector.

6 Claims, 22 Drawing Sheets

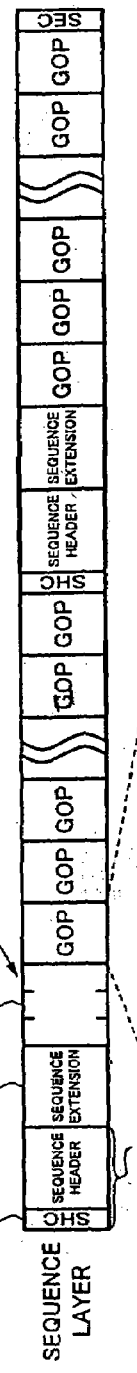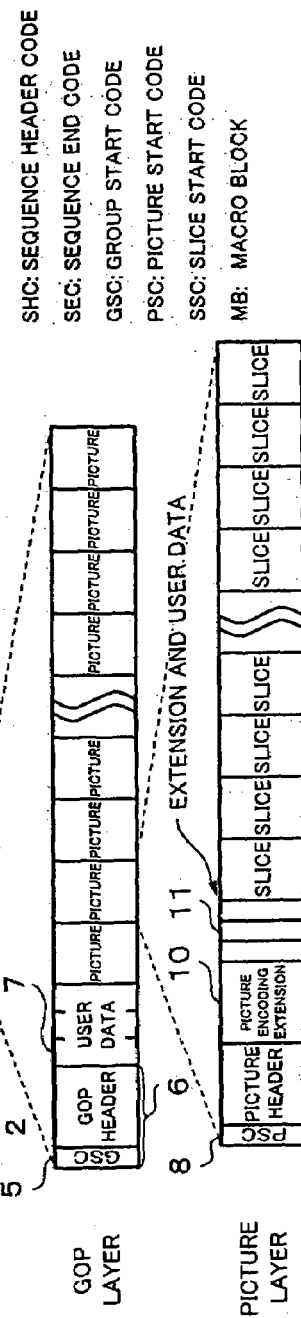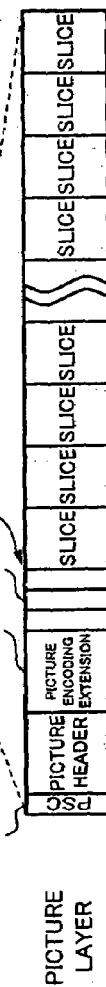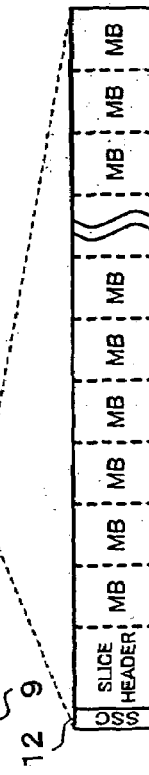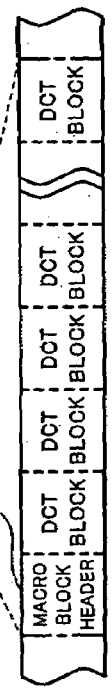
Fig. 1A SEQUENCE LAYER
Fig. 1B GOP LAYER
Fig. 1C PICTURE LAYER
Fig. 1D SLICE LAYER
Fig. 1E MACRO BLOCK LAYER
SHC: SEQUENCE HEADER CODE
SEC: SEQUENCE END CODE
GSC: GROUP START CODE
PSC: PICTURE START CODE
SSC: SLICE START CODE
MB: MACRO BLOCK
RELATED ART

Fig. 2

| CODE NAME | NUMBER OF BITS | CONTENT |
|---|---|---|
| sequence header code | 32 | SEQUENCE HEADER CODE |
| horizontal size value | 12 | LOW ORDER 12 BITS OF NUMBER OF PIXELS IN HORIZONTAL DIRECTION |
| vertical size value | 12 | LOW ORDER 12 BITS OF NUMBER OF PIXELS IN VERTICAL DIRECTION |
| aspect ratio information | 4 | PIXEL ASPECT RATIO INFORMATION |
| frame rate code | 4 | FRAME RATE CODE |
| bit rate value | 18 | LOW ORDER 18 BITS OF BIT RATE (INDICATION AS BLOCKS OF 400 BITS) |
| vbv buffer size value | 10 | LOW ORDER 10 BITS OF VBV BUFFER SIZE |
| intra quantiser matrix [64] | 8 * 64 | INTRA MB QUANTIZING MATRIX VALUE |
| non intra quantiser matrix [64] | 8 * 64 | NON-INTRA MB QUANTIZING MATRIX VALUE |

Fig. 3

| CODE NAME | NUMBER OF BITS | CONTENT |
| --- | --- | --- |
| profile and level indication | 8 | PROFILE, LEVEL |
| progressive sequence | 1 | OVERALL SEQUENCE PROGRESSIVE PICTURE FLAG |
| chroma format | 2 | COLOR DIFFERENCE FORMAT |
| low delay | 1 | LOW DELAY MODE (WITHOUT B PICTURE) |

Fig. 4

| CODE NAME | NUMBER OF BITS | CONTENT |
|---|---|---|
| extension data (0) | | EXTENSION DATA (0) |
| sequence display extension ( ) | | SEQUENCE INDICATION ( ) |
| sequence scalable extension ( ) | | SEQUENCE SCALABLE EXTENSION ( ) |
| extension start code identifier | 4 | SEQUENCE SCALABLE EXTENSION ID |
| scalable mode | 2 | SCALABILITY MODE |
| layer id | 4 | LAYER ID OF SCALABLE HIERARCHY |
| SPATIAL SCALABILITY | | |
| lower layer prediction horizontal size | 14 | HORIZONTAL SIZE OF PREDICTIVE LOWER LAYER |
| lower layer prediction vertical size | 14 | VERTICAL SIZE OF PREDICTIVE LOWER LAYER |
| vertical subsampling factor n | 5 | DIVISOR FOR UP SAMPLE IN VERTICAL DIRECTION |
| TEMPORAL SCALABILITY | | |
| picture mux order | 3 | NUMBER OF PICTURES OF ADDITIONAL LAYER FOLLOWED BY FIRST BASE LAYER |
| picture mux factor | 3 | NUMBER OF PICTURES OF ADDITIONAL LAYER BETWEEN BASE LAYERS |
| user data ( ) | | USER DATA ( ) |
| user data | 8 | USER DATA |

Fig. 5

| CODE NAME | NUMBER OF BITS | CONTENT |
|---|---|---|
| group start code ( ) | 32 | GOP START CODE |
| time code | 25 | TIME CODE (HOUR, MINUTE, SECOND, PICTURE) |
| closed gop | 1 | FLAG REPRESENTING INDEPENDENSY OF GOP |
| broken link | 1 | FLAG REPRESENTING VALIDITY OF B PICTURE FOLLOWED BY I PICTURE OF GOP |

Fig. 6

| CODE NAME | NUMBER OF BITS | CONTENT |
|---|---|---|
| extension data (1) | | EXTENSION DATA (1) |
| user data ( ) | | USER DATA ( ) |
| user data | 8 | USER DATA |

Fig. 7

| CODE NAME | NUMBER OF BITS | CONTENT |
|---|---|---|
| picture start code | 32 | PICTURE START CODE |
| temporal reference | 10 | DISPLAY SEQUENCE OF PICTURES IN GOP (MODULO 1024) |
| picture coding type | 3 | PICTURE ENCODING TYPE (I, B, P) |
| vbv delay | 16 | VBV DELAY AMOUNT UNTILL START OF DECODING |

Fig. 8

| CODE NAME | NUMBER OF BITS | CONTENT |
|---|---|---|
| f code [s][t] | 4 | RANGE OF MOVING VECTOR IN FORWARD/BACKWARD DIRECTIONS (s) AND HORIZONTAL/VERTICAL DIRECTIONS (t) |
| intra dc precision | 2 | ACCURACY OF DC COEFFICIENTS OF INTRA MB |
| picture structure | 2 | PICTURE STRUCTURE (FRAME, FIELD) |
| top field first | 1 | DESIGNATING DISPLAY FIELD |
| frame pred frame dct | 1 | FRAME PREDICTION + FRAME DCT FLAG |
| concealment motion vectors | 1 | INTRA MB CONCEALMENT MV FLAG |
| q scale type | 1 | QUANTIZING SCALE TYPE (LINEAR, NON-LINEAR) |
| intra vlc format | 1 | VLC TYPE FOR INTRA MB |
| alternate scan | 1 | SCANNING TYPE (ZIGZAG, ALTERNATE) |
| repeat first field | 1 | 2 : 3 PULL-DOWN FIELD REPEAT |
| chroma 420 type | 1 | SAME VALUE AS PROGESSIVE FRAME IN CHROMA FORMAT 4 : 2 : 0 |
| progressive frame | 1 | PROGRESSIVE FRAME FLAG |

Fig. 9

| CODE NAME | NUMBER OF BITS | CONTENT |
|---|---|---|
| extension data (2) | | EXTENSION DATA (2) |
| quant matrix extension ( ) | | QUANTIZING MATRIX EXTENSION ( ) |
| intra quantiser matrix [64] | 8 * 64 | INTRA MB QUANTIZING MATRIX |
| non intra quantiser matrix [64] | 8 * 64 | NON-INTRA MB QUANTIZING MATRIX |
| chroma intra quantiser matrix [64] | 8 * 64 | CHROMA INTRA QUANTIZING MATRIX |
| chroma non intra quantiser matrix [64] | 8 * 64 | CHROMA NON-INTRA QUANTIZING MATRIX |
| copyright extension ( ) | | COPYRIGHT EXTENSION ( ) |
| picture display extension ( ) | | PICTURE DISPLAY EXTENSION ( ) |
| picture spatial scalable extension ( ) | | PICTURE SPACE SCALABLE EXTENSION ( ) |
| spatial temporal weight code table index | 2 | SPATIAL AND TEMPORAL WEIGHTING TABLE FOR UP SAMPLE |
| lower layer progressive frame | 1 | LOWER LAYER PROGRESSIVE PICTURE FLAG |
| lower layer deinterlaced field select | 1 | LOWER LAYER FIELD SELECTION |
| picture temporal scalable extension ( ) | | PICTURE TEMPORAL SCALABLE EXTENSION ( ) |
| reference select code | 2 | SELECTION OF REFERENCE SCREEN |
| forward temporal reference | 10 | PICTURE NUMBER OF FORWARD PREDICTIVE LOWER LAYER |
| backward temporal reference | 10 | PICTURE NUMBER OF BACKWARD PREDICTIVE LOWER LAYER |
| user data ( ) | | USER DATA ( ) |
| user data ( ) | 8 | USER DATA |

Fig. 10

| CODE NAME | NUMBER OF BITS | CONTENT |
|---|---|---|
| slice start code | 32 | SLICE START CODE + SLICE VERTICAL POSITION |
| slice vertical position extension | 3 | SLICE VERTICAL POSITION EXTENSION ( > 2800 LINES ) |
| priority breakpoint | 7 | DATA PARTITIONING BREAKPOINT |
| quantiser scale code | 5 | QUANTIZING SCALE CODE (1 TO 31) |
| intra slice | 1 | INTRA SLICE FLAG |
| macroblock ( ) | | MACRO BLOCK DATA ( ) |

Fig. 11

| CODE NAME | NUMBER OF BITS | CONTENT |
|---|---|---|
| macroblock escape | 11 | MB ADDRESS EXTENSION ( > 33 ) |
| macroblock address increment | 1-11 | DIFFERENCE BETWEEN CURRENT MB ADDRESS AND PRECEDING MB ADDRESS |
| macroblock modes ( ) | | MACRO BLOCK MODE ( ) |
| macroblock type | 1-9 | MB ENCODING TYPE ( MC, CODED, etc ) |
| spatial temporal weight code | 2 | TEMPORAL/SPATIAL WEIGHTING CODE FOR UP SAMPLE |
| frame motion type | 2 | MOTION COMPENSATION TYPE OF FRAME STRUCTURE |
| field motion type | 2 | MOTION COMPENSATION TYPE OF FIELD STRUCTURE |
| dct type | 1 | DCT TYPE (FRAME, FIELD) |
| quantiser scale code | 5 | MB QUANTIZING SCALE CODE (1 TO 31) |
| motion vectors (s) | | MOVING VECTOR (s) |
| motion vertical field select [ r ][ s ] | 1 | SELECTION OF REFERENCE FIELD USED FOR PREDICTION |
| motion vector ( r , s ) | | MOVING VECTOR (r, s) |
| motion code [ r ][ s ][ t ] | 1-11 | BASIC DIFFERENCE MOVING VECTOR |
| motion residual [ r ][ s ][ t ] | 1-8 | DIFFERENCE VECTOR |
| dmvector [ t ] | 1-2 | DIFFERENCE VECTOR FOR DUAL PRIME |
| coded block pattern ( ) | | CBP |
| block ( i ) | | BLOCK DATA ( ) |

Fig. 12

| CODE NAME | NUMBER OF BITS | CONTENT |
|---|---|---|
| dct dc size luminance | 2–9 | DCT LUMINANCE DC COEFFICIENT DIFFERENCE SIZE |
| dct dc differential | 1–11 | DCT LUMINANCE DC COEFFICIENT DIFFERENCE VALUE |
| dct dc size chrominance | 2–10 | DCT CHROMINANCE DC COEFFICIENT DIFFERENCE SIZE |
| dct dc differential | 1–11 | DCT CHROMINANCE DC COEFFICIENT DIFFERENCE VALUE |
| First DCT coefficient | 3–24 | FIRST NON-ZERO COEFFICIENT OF NON-INTRA BLOCK |
| Subsequent DCT coefficient | 2–24 | DCT COEFFICIENT THAT FOLLOWS |
| End of block | 2 or 4 | DCT COEFFICIENT END FLAG IN BLOCK |

Fig. 13A

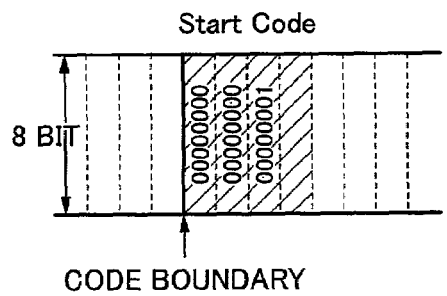

Fig. 13B

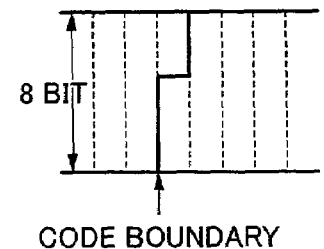

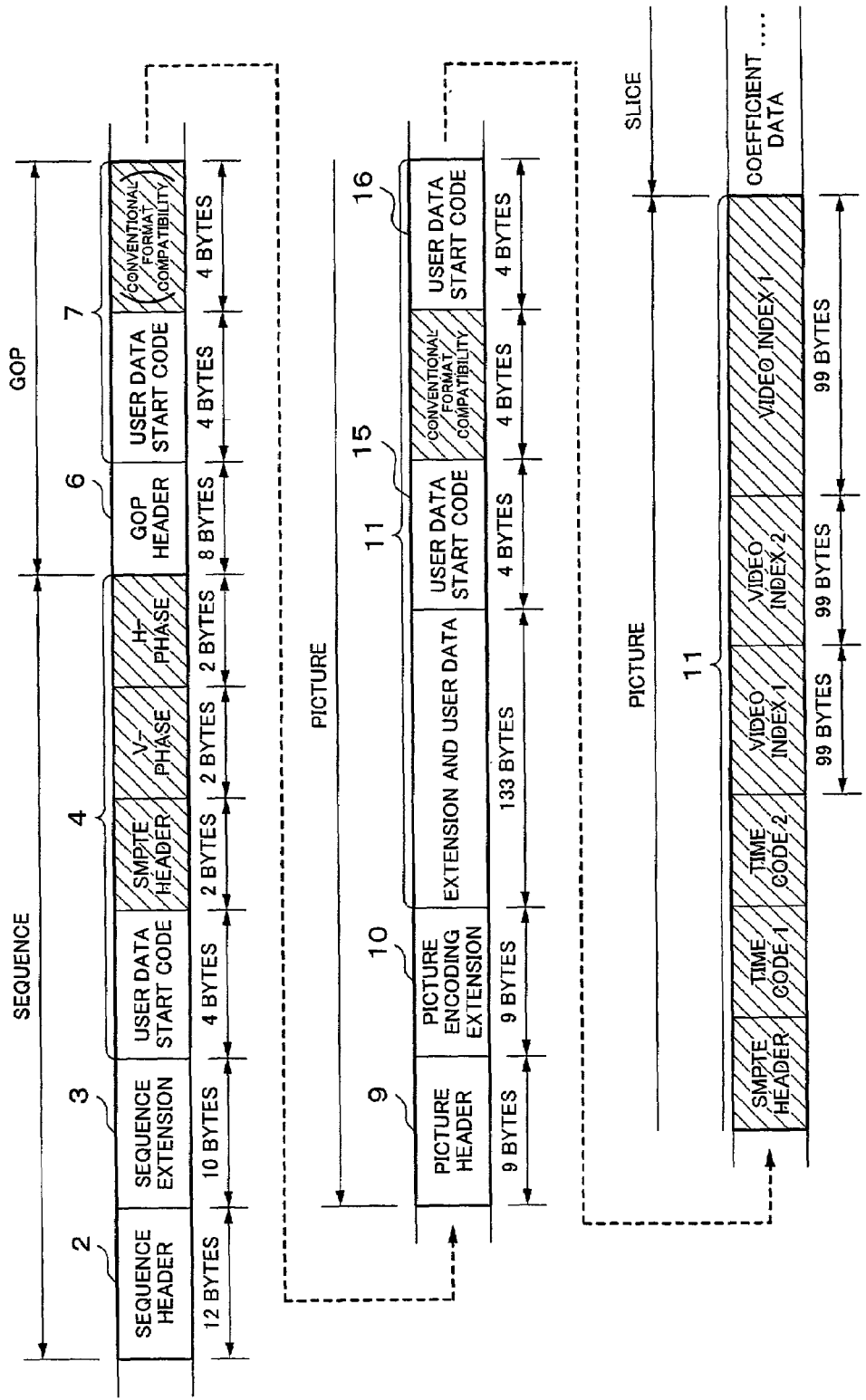

TRACING DIRECTION OF HEAD

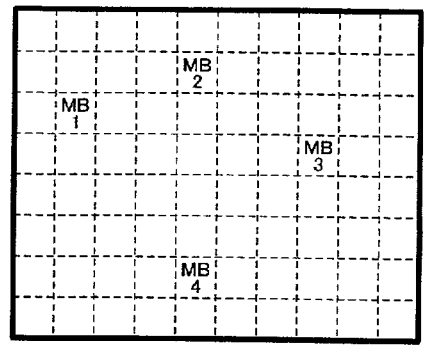
Fig. 20A
Fig. 20B
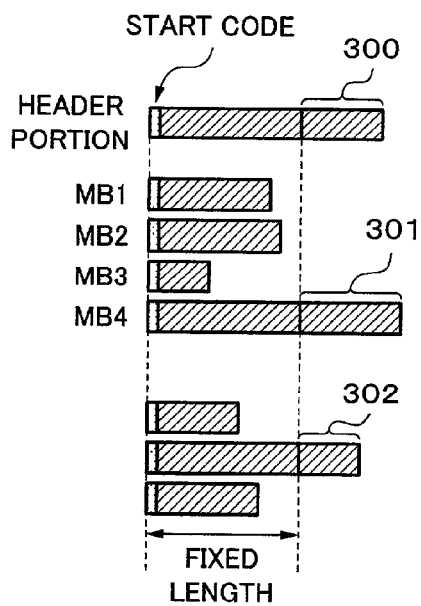
Fig. 20C
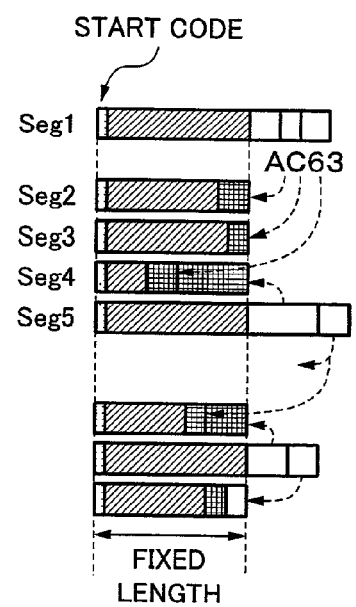
Fig. 20D
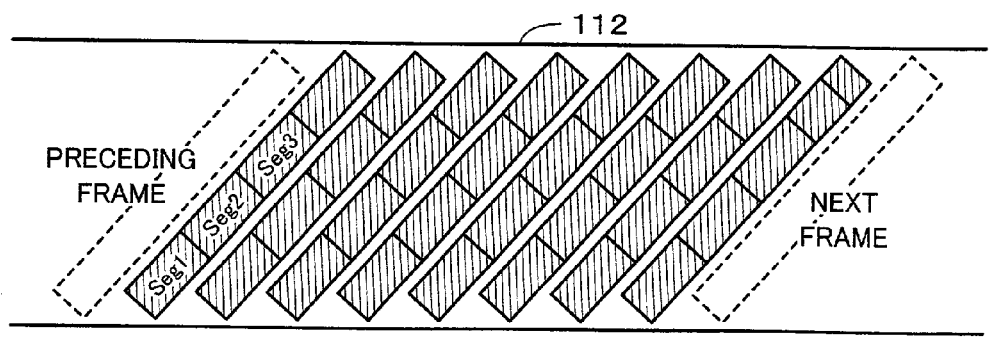

RECORDING APPARATUS AND METHOD

TECHNICAL FIELD

The present invention relates to a recording apparatus and a recording method for allowing a digital video signal that has been compression-encoded using variable length code to be recorded as blocks each having a predetermined fixed length to a record medium.

BACKGROUND ART

As exemplified with a digital VTR (Video Tape Recorder), a data recording and reproducing apparatus that records a digital video signal and a digital audio signal to a record medium and reproduces them therefrom is known. Since the data capacity of a digital video signal is huge, conventionally, it is compression-encoded corresponding to a predetermined method and then the encoded data is recorded to a record medium. In recent years, MPEG2 (Moving Picture Experts Group phase 2) is known as a compression-encoding standard.

In picture compression technologies such as the above-mentioned MPEG2, the data compression ratio is improved using variable length code. Thus, depending on the complexity of a picture that is compressed, the amount of compressed code per screen (for example, per frame or per field) fluctuates.

On the other hand, in a recording apparatus that records a video signal to a record medium such as a magnetic tape or a disc record medium, particularly, in a VTR, a predetermined unit such as one frame or one field is used as a unit of a fixed length. In other words, the amount of code per frame or field is limited to a predetermined value or less and recorded to a fixed capacity area of a storage medium.

The reason why the fixed length format is used for a VTR is in that since each record area on a magnetic tape as a record medium is composed of one frame, record data for one frame should be just placed in each record area. In addition, since the record medium is used corresponding to record time, the total amount of record data on the record medium and the remaining amount thereof can be accurately obtained. As another advantage, a program start position detecting process can be easily performed in a high speed searching operation. In addition, from a view point of controlling of a record medium, if the record medium is a magnetic tape, when data is recorded in the fixed length format, since the magnetic tape that is dynamically driven can be traveled at a constant speed, the magnetic tape can be stably controlled. Likewise, these advantages can apply to disc shaped record mediums.

The variable length code encoding format and the fixed length format have such contrary characteristics. In recent years, a recording apparatus that inputs a video signal as a non-compressed base band signal, compression-encodes the signal with variable length code corresponding to MPEG2 or JPEG (Joint Photographic Experts Group), and records the encoded signal to a record medium is known. In addition, a recording and reproducing apparatus that directly inputs and outputs a stream that has been compression-encoded with variable length code and records and reproduces the stream has been also proposed. In the following description, it is assumed that the compression encoding format for a digital video signal is MPEG2.

Next, the structure of an MPEG2 data stream will be described in brief. MPEG2 is a combination of a motion compensation predictive encoding and a compression encoding using DCT. MPEG2 data is hierarchically structured. The MPEG2 data is composed of a block layer as the lowest layer, a macro block layer, a slice layer, a picture layer, a GOP (Group Of Picture) layer, and a sequence layer as the highest layer.

The block layer is composed of DCT blocks each of which is a data unit for DCT. The macro block layer is composed of a plurality of DCT blocks. The slice layer is composed of a header portion and at least one macro block. The picture layer is composed of a header portion and at least one slice. One picture corresponds to one screen. The GOP layer is composed of a header portion, an I picture (Intra-coded picture), a P picture (Predictive-coded picture), and a B picture (Bidirectionally predictive-coded picture).

The I picture uses information of only a picture that is encoded. Thus, the I picture can be decoded as it is. The P picture uses an I picture or a P picture that has been decoded before the current P picture is decoded. The difference between the current P picture and the motion compensated predictive picture is encoded or the current P picture is encoded without the difference. One of them is selected for each macro block depending on which is more effective. The B picture uses (1) an I picture or a P picture that has been decoded before the current B picture is decoded, (2) an I picture or a P picture that has been decoded before the current B picture is decoded, or (3) an interpolated picture of (1) and (2). The difference between the current B picture and each of the three types of the motion compensated predictive pictures is encoded or the current B picture is encoded without the difference. One of them is selected for each macro block depending on which is the most effective.

Thus, as types of macro blocks, there are an intra-frame encoded macro block, a forward inter-frame predictive macro block of which a future macro block is predicted with a past macro block, a backward inter-frame predictive macro block of which a past macro block is predicted with a future macro block, and a bidirectional macro block that is predicted in both the forward and backward directions. All macro blocks in an I picture are all intra-frame macro blocks. A P picture contains an intra-frame macro block and a forward inter-frame predictive macro block. A B picture contains all the four types of macro blocks.

A macro block is a set of a plurality of DCT blocks and formed by dividing one screen (picture) into a lattice of 16 pixels×16 lines. A slice is formed by connecting macro blocks for example in the horizontal direction. The number of macro blocks per one screen depends on the size thereof.

In the MPEG format, one slice is one variable length code sequence. The variable length code sequence is a sequence of which the boundary of data cannot be detected unless variable length code is correctly decoded. When an MPEG stream is decoded, the header portion of a slice is detected so as to obtain the start point and the end point of variable length code.

In MPEG, conventionally, one slice is composed of one stripe (16 lines). The variable length encoding starts at the left edge of the screen and ends at the right edge of the screen. Thus, when a VTR has recorded an MPEG elementary stream, if it is reproduced at high speed, the VTR mainly reproduces the left edge of the screen. Thus, the screen cannot be equally updated. In addition, since the position on the tape cannot be predicted, if a tape pattern is traced at predetermined intervals, the screen cannot be equally updated. Moreover, if at least one error takes place, it adversely affects until the right edge of the screen. Thus, until the next slice header is detected, the error continues.

Thus, when one slice is preferably composed of one macro block, such an inconvenience can be solved.

On the other hand, a video signal is recorded on a magnetic tape in helical track format of which tracks are diagonally formed with a rotating head. On one track, sync blocks, each of which is the minimum record unit, are grouped for each data type as sectors. In addition, record data for one frame is recorded at a predetermined record area. For example, record data for one frame is recorded with eight tracks.

In a digital VTR, an editing process is normally performed. The editing process is preferably performed in as small data unit as possible. When an MPEG2 stream has been recorded, one GOP may be used as an edit unit. In the structure of a closed GOP of which a GOP can be decoded without need to use an earlier GOP or a later GOP, an editing process can be performed for each GOP. However, when a GOP is composed of for example 15 frames, the editing unit is too large.

In MPEG, to allow data to be accessed at random, a GOP (Group Of Picture) structure as a group of a plurality of pictures is defined. The provisions with respect to GOP in MPEG state that firstly the first picture of a GOP as a stream is an I picture and that secondly the last picture of a GOP in the order of original pictures is an I picture or a P picture. In addition, as a GOP, a structure of which a prediction using the last I picture or P picture of an earlier GOP is required is permitted. A GOP that can be decoded without need to use a picture of an earlier GOP is referred to as closed GOP.

In MPEG, since coding is performed using a correlation of frames for each GOP, when an MPEG bit stream is edited, there is a restriction. In other words, when the end of a GOP matches an edit point, as long as the GOP is a closed GOP, no problem takes place. However, the length of one GOP is often as large as 0.5 seconds, the period as an edit point is too long. Thus, generally, it is preferred to perform an editing operation in the accuracy of frame (picture).

However, when an MPEG stream contains a predictive picture that requires an earlier picture or both an earlier picture and a later picture for decoding the predictive picture, it becomes impossible to perform the editing process for each frame. Thus, preferably, all pictures are encoded with intra-frame code and one GOP is composed of one intra-picture. Such a stream satisfies the encoding syntax of MPEG2.

In addition, at the beginning of each of the sequence layer, the GOP layer, the picture layer, the slice layer, and the macro block layer, identification code composed of a predetermined bit pattern is placed. The identification code is followed by a header portion that contains encoding parameters of each layer. An MPEG decoder that performs an MPEG2-decoding process extracts identification code by a pattern-matching operation, determines the hierarchical level, and decodes the MPEG stream corresponding to the parameter information contained in the header portion. The header of each layer lower than the picture layer is information necessary for each frame. Thus, the header should be added to each frame. In contrast, the header of the sequence layer should be added to each sequence or each GOP. In other words, it is not necessary to add the header of the sequence layer to each frame.

Now, the header of the sequence layer will be described. Information contained in the header of the sequence layer is number of pixels, bit rate, profile, level, color difference format, progressive sequence, and so forth. These information is normally the same in all the sequence when it is assumed that one video tape is one sequence. According to the encoding syntax of MPEG, the header of the sequence layer can be added at the beginning of the video tape. In addition, according to the encoding syntax of MPEG, a quantizing matrix may be present in the header of other than the sequence layer (namely, the header of the sequence layer or the header of the picture layer). According to the encoding syntax of MPEG, the quantizing matrix can be added or omitted.

Thus, the editing operation can be performed in the accuracy of one frame. However, the chronological relation between frames of a non-edited and those of an edited tape may be inverted. FIG. 25 shows an outline of such a problem. FIG. 25A shows a chronological relation of frames of a stream that has not been edited. Picture headers are added to picture data of frames 4 and 5, whereas headers of the sequence layer and the GOP layer are not added to the picture data of frames 4 and 5. However, using information of the header of the sequence layer and the header of the GOP layer added to the preceding frame 3, these picture data can be decoded.

When an editing process is performed, the chronological relation of frames is inverted. For example, as shown in FIG. 25B, picture data of frames 4 and 5 may be placed at chronological positions of frames 1 and 2 before the frame 3. As is clear from the example, after the editing process is performed, the header of the sequence layer may not be present at the beginning of the video tape. Alternatively, the header of the sequence layer may not be present at any position of one video tape. Thus, before a tape is edited, it satisfies the encoding syntax of MPEG. However, after the tape is edited, it may not satisfy the encoding syntax of MPEG. When the tape does not satisfy the encoding syntax of MPEG, the tape cannot be MPEG-decoded. As was described above, since one GOP is composed of one I picture, even if the header of the GOP layer is not obtained, no problem takes place. In the case that the header of the sequence layer is recorded only at the beginning of the tape, when the tape is reproduced from any position other than the beginning thereof, the header of the sequence layer may not be obtained. In addition, when the tape is inversely reproduced, as with the editing process, the chronological relation of frames is inverted. Moreover, in special reproducing operations such as high speed reproducing operation and slow reproducing operation, the header of the sequence layer may not be obtained.

In addition, according to the encoding syntax of MPEG a quantizing matrix may be placed in a header of other than the sequence layer. However, the encoding syntax of MPEG does not state that a quantizing matrix is always placed in each frame. Thus, as with the header of the sequence layer, the quantizing matrix may not be obtained before the MPEG decoding is performed after the editing process for each frame is performed. When the tape is reproduced from any position or when a special reproducing operation is performed, the header of the sequence layer may not be obtained.

Therefore, an object of the present invention is to provide a recording apparatus and a recording method that allow an editing process for each frame to be performed and a bit stream regularly reproduced from any position or reproduced in a special manner such as inverse reproduction to satisfy the encoding syntax with assurance.

DISCLOSURE OF THE INVENTION

Claim 1 of the present invention is a recording apparatus for compression-encoding a digital video signal, generating a bit stream having a hierarchical structure composed of a plurality of hierarchical levels, and recording the bit stream to a record medium, comprising:

an encoding means for intra-frame encoding all the digital video signal so as to compress the digital video signal, an adding means for adding a header of the highest hierarchical level to the bit stream of each frame, and a recording means for recording the bit stream to which the header of the highest hierarchical level has been added to the record medium.

Claim 5 of the present invention is a recording apparatus for compression-encoding a digital video signal, generating a bit stream having a hierarchical structure composed of a plurality of hierarchical levels, and recording the bit stream to a record medium, comprising:

an encoding means for intra-frame encoding all the digital video signal so as to compress the digital video signal, an adding means for adding a quantizing matrix to the bit stream of each frame, and a recording means for recording the bit stream to which the quantizing matrix has been added to the record medium.

Claim 9 of the present invention is a recording method for compression-encoding a digital video signal, generating a bit stream having a hierarchical structure composed of a plurality of hierarchical levels, and recording the bit stream to a record medium, comprising the steps of:

intra-frame encoding all the digital video signal so as to compress the digital video signal, adding a header of the highest hierarchical level to the bit stream of each frame, and recording the bit stream to which the header of the highest hierarchical level has been added to the record medium.

Claim 10 of the present invention is a recording method for compression-encoding a digital video signal, generating a bit stream having a hierarchical structure composed of a plurality of hierarchical levels, and recording the bit stream to a record medium, comprising the steps of:

intra-frame encoding all the digital video signal so as to compress the digital video signal, adding a quantizing matrix to the bit stream of each frame, and recording the bit stream to which the quantizing matrix has been added to the record medium.

According to the present invention, data of all frames is encoded corresponding to intra-frame encoding so as to allow each frame to be edited. When each frame is recorded on a record medium, the header of the sequence layer and the quantizing matrix are added to each frame. Thus, data that has been edited and reproduced in a special reproduction such as an inverse reproduction can be prevented from being unsatisfied with the encoding syntax.

BRIEF DESCRIPTION OF DRAWINGS

FIG. 1 is a schematic diagram showing the hierarchical structure of a conventional MPEG2 stream.

FIG. 2 is a schematic diagram showing the contents of data placed in an MPEG2 stream and bit assignments thereof.

FIG. 3 is a schematic diagram showing the contents of data placed in an MPEG2 stream and bit assignments thereof.

FIG. 4 is a schematic diagram showing the contents of data placed in an MPEG2 stream and bit assignments thereof.

FIG. 5 is a schematic diagram showing the contents of data placed in an MPEG2 stream and bit assignments thereof.

FIG. 6 is a schematic diagram showing the contents of data placed in an MPEG2 stream and bit assignments thereof.

FIG. 7 is a schematic diagram showing the contents of data placed in an MPEG2 stream and bit assignments thereof.

FIG. 8 is a schematic diagram showing the contents of data placed in an MPEG2 stream and bit assignments thereof.

FIG. 9 is a schematic diagram showing the contents of data placed in an MPEG2 stream and bit assignments thereof.

FIG. 10 is a schematic diagram showing the contents of data placed in an MPEG2 stream and bit assignments thereof.

FIG. 11 is a schematic diagram showing the contents of data placed in an MPEG2 stream and bit assignments thereof.

FIG. 12 is a schematic diagram showing the contents of data placed in an MPEG2 stream and bit assignments thereof.

FIG. 13 is a schematic diagram for explaining an arrangement of bytes of data.

FIG. 14 is a schematic diagram showing the data structure of an MPEG stream according to the embodiment of the present invention.

FIG. 20 is a schematic diagram showing in reality the packing process.

BEST MODES FOR CARRYING OUT THE INVENTION

Figure 15:
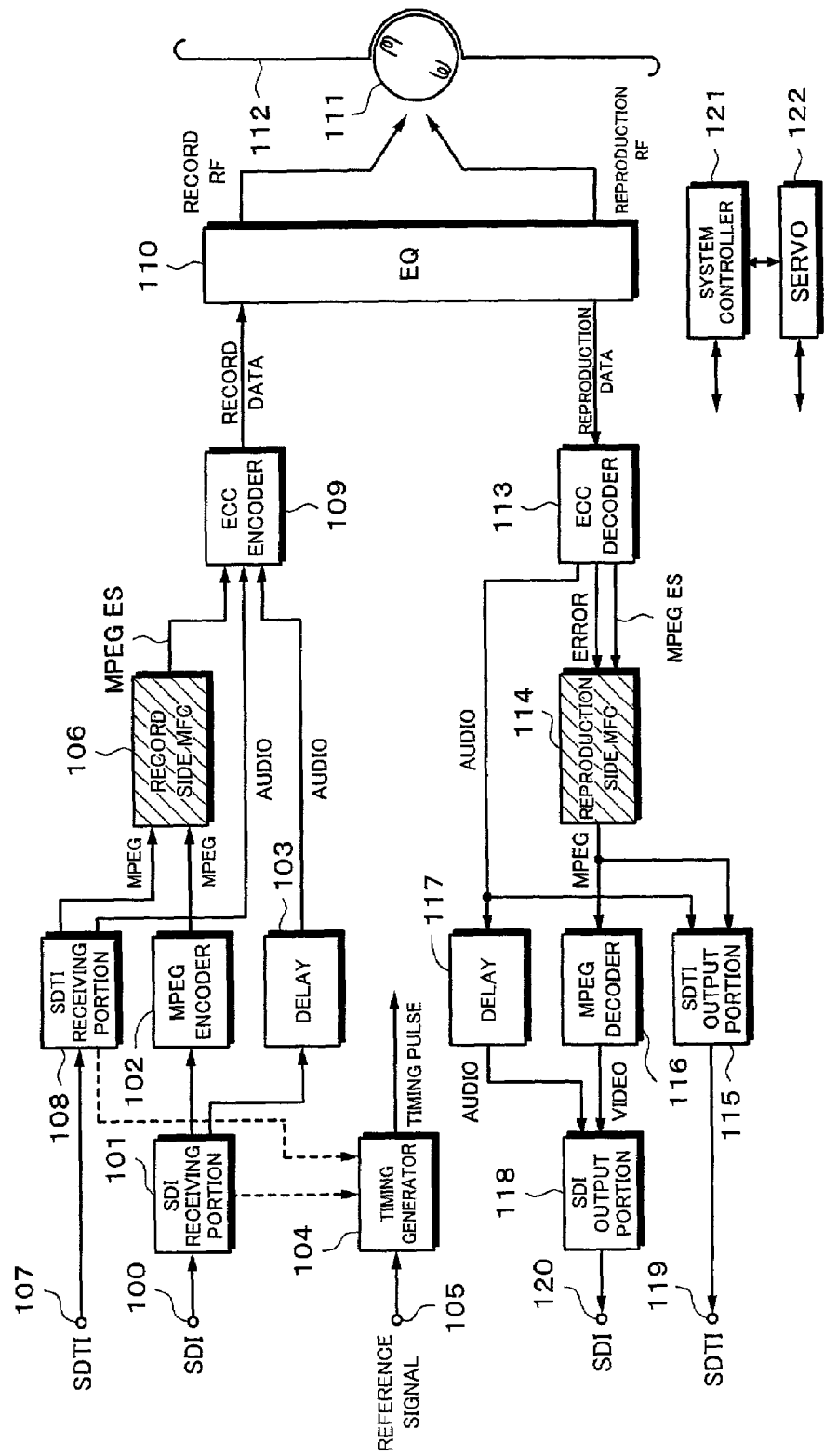
FIG. 15 is a block diagram showing an example of the structure of a recording and reproducing apparatus according to the embodiment of the present invention.

Next, an embodiment of the present invention will be described. The embodiment is applied to a digital VTR. The embodiment is suitable for the environment of a broadcasting station.

According to the embodiment, for example MPEG2 is used as a compression formation. The MPEG2 is a combination of a motion compensation predictive encoding and a compression encoding using DCT. MPEG2 data is hierarchically structured. As shown in FIG. 1, MPEG2 data is composed of a macro block layer (FIG. 1E) as the lowest layer, a slice layer (FIG. 1D), a picture layer (FIG. 1C), a GOP layer (FIG. 1B), and a sequence layer (FIG. 1A) as the highest layer.

As shown in FIG. 1E, the macro block layer is composed of DCT blocks each of which is a data unit for DCT. The macro block layer is composed of a macro block header and a plurality of DCT blocks. As shown in FIG. 1D, the slice layer is composed of a slice header portion and at least one macro block. As shown in FIG. 1C, the picture layer is composed of a picture header portion and at least one slice. One picture corresponds to one screen. As shown in FIG. 1B, the GOP layer is composed of a GOP header portion, an I picture, a P picture, and a B picture. The I picture is a picture that has been intra-frame encoded. The P and B pictures are pictures that have been predictively encoded.

According to the encoding syntax of MPEG, one GOP contains at least one I picture. However, one GOP may contain neither a P picture nor a B picture. As shown in FIG. 1A, the sequence layer, which is the highest layer, is composed of a sequence header portion and a plurality of GOPs. In the MPEG format, a slice is one variable length code sequence. The variable length code sequence is a sequence of which the boundary of data cannot be detected unless variable length code is correctly decoded.

At the beginning of each of the sequence layer, the GOP layer, the picture layer, and the slice layer, a start code is placed. The start code is a predetermined bit pattern composed of bytes. The start code differs in each of the layers. Particularly, in the sequence layer, the start code is referred to as sequence header code. In each of the other layers, the start code is just referred to as start code. Each start code has a bit pattern of [00 00 01 xx] (hexadecimal notation). Thus, the bit pattern has four set of two digits. In addition, [xx] represents that each layer has a unique bit pattern.

In other words, each of the start codes and the sequence header code is composed of four bytes (=32 bits). Corresponding to the value of the fourth byte, the type of information that follows is identified. Since each of the start codes and the sequence header code is arranged in bytes, they can be acquired by matching a pattern of four bytes.

The high order four bits of one byte preceded by the start code is an identifier the represents the content of an extension data area (that will be described later). Corresponding to the value of the identifier, the content of the extension data can be identified.

Each DCT block in the macro block layer or each DCT block in each macro block does not have an identification code having a predetermined bit pattern arranged in bytes.

Next, the header portion of each layer will be described in detail. In the sequence layer shown in FIG. 1A, at the beginning, a header 2 is placed. The header 2 is followed by a sequence extension 3 and extension and user data 4. At the beginning of the sequence header 2, a sequence header code 1 is placed. Likewise, at the beginning of each of the sequence extension 3 and the user data 4, a predetermined start code (not shown) is placed. The area from the sequence header 2 to the extension and user data 4 is a header portion of the sequence layer.

FIG. 2 shows contents and assigned bits of the sequence header 2. As shown in FIG. 2, the sequence header 2 contains sequence header code 1, encoded picture size (composed of the number of pixels in horizontal direction and the number of lines in vertical direction), aspect ratio, frame rate, bit rate, VBV (Video Buffering Verifier) buffer size, and quantizing matrix that are designated for each sequence with the designated numbers of bits.

As shown in FIG. 3, the sequence extension 3 preceded by the extension start code preceded by the sequence header designates additional data used in MPEG2. The addition data is for example profile, level, chroma (color difference) format, and progressive sequence. As shown in FIG. 4, the extension and user data 4 contains sequence indication ( ) and sequence scalable extension ( ). The sequence indication ( ) contains information of RGB conversion characteristic of an original signal and display screen size. The sequence scalable extension ( ) designates a scalability mode and the layer of scalability.

The header portion of the sequence layer is followed by GOPs. As shown in FIG. 1B, at the beginning of each GOP, GOP header 6 and user data 7 are placed. The GOP header 6 and the user data 7 are a header portion of each GOP. As shown in FIG. 5, the GOP header 6 contains start code 5, time code, and flags representing independency and validity of the GOP with the designated numbers of bits. As shown in FIG. 6, the user data 7 contains extension data and user data. At the beginning of each of the extension data and the user data, predetermined start code (not shown) is placed.

The header portion of the GOP layer is followed by pictures. As shown in FIG. 1C, at the beginning of each picture, picture header 9, picture encoding extension 10, and extension and user data 11 are placed. At the beginning of the picture header 9, picture start code 8 is placed. At the beginning of each of the picture encoding extension 10 and the extension and user data 11, a predetermined start code is placed. The area from the picture header 9 to the user data 11 is a header portion of each picture.

As shown in FIG. 7, the picture header 9 contains picture start code 8. In addition, in the picture header 9, encoding condition for a screen is designated. As shown in FIG. 8, in the picture encoding extension 10, the range of a moving vector in the forward, backward, and horizontal/vertical directions is designated. In addition, the picture structure is designated. In the picture encoding extension 10, the accuracy of DC coefficients of an intra-macro block is designated; the VLC type is selected; the linear/non-linear quantizing scale is selected; and the scanning method in DCT is selected.

As shown in FIG. 9, in the extension and user data 11, quantizing matrix, spatial scalable parameter, and so forth are designated. They can be designated for each picture. Thus, a picture can be encoded corresponding to characteristics of each screen. Moreover, in the extension and user data 11, the picture display area can be designated. Furthermore, in the extension and user data 11, copyright information can be designated.

The header portion of the picture layer is followed by slices. As shown in FIG. 1D, at the beginning of each slice, slice header 13 is placed. At the beginning of the slice header 13, slice start code 12 is placed. As shown in FIG. 10, the slice start code 12 includes position information in the vertical direction of the current slice. In addition, the slice header 13 contains extended slice vertical position information, quantizing scale information, and so forth.

The header portion of the slice layer is followed by macro blocks (see FIG. 1E). Each macro block contains a macro block header 14 and a plurality of DCT blocks. As was described above, the macro block header does not contain a start code. As shown in FIG. 11, the macro block header 14 contains relative position information of the current macro block. In addition, in the macro block header 14, motion compensation mode and detail information about DCT encoding are designated.

The macro block header 14 is followed by DCT blocks. As shown in FIG. 12, each DCT block contains variable-length code encoded DCT coefficients and data about DCT coefficients.

In FIG. 1, solid line partitions of each layer represent that data is arranged in bytes, whereas dotted line partitions thereof represent that data is not arranged in bytes. In other words, as shown in FIG. 13A, in higher layers up to the picture layer, the boundary of code is delimited in bytes. On the other hand, in the slice layer, only the slice start code 12 is delimited in bytes. As shown in FIG. 13B, each macro block can be delimited in bits. Likewise, in the macro block layer, each DCT block can be delimited in bits.

On the other hand, to prevent a signal from being deteriorated in a decoding and an encoding, it is preferred to edit encoded data. At that point, when a P picture and a B picture are decoded, a picture that is chronologically preceded by the current picture or pictures that are chronologically preceded and followed by the current picture are required. Thus, the editing cannot be performed in each frame. In consideration of that point, according to the embodiment, one GOP is composed of only one I picture.

In addition, record data of for example one frame is recorded at a predetermined position. In MPEG2, since variable length encoding is used, the amount of data for one frame is controlled so that data generated in one frame period can be recorded to a predetermined record area. In addition, according to the embodiment, so that MPEG2 data can be properly recorded to a magnetic tape, one slice is composed of one macro block. Moreover, one macro block is packed to a predetermined fixed length.

FIG. 14 shows the headers of an MPEG stream according to the embodiment in reality. As is clear from FIG. 1, at the beginnings of the sequence layer, the GOP layer, the picture layer, the slice layer, and the macro block layer, the headers are placed. FIG. 14 shows an example of a data arrangement starting with the sequence header portion.

At the beginning, sequence header 2 having the length of 12 bytes is placed. The sequence header 2 is followed by sequence extension 3 having the length of 10 bytes. The sequence extension 3 is followed by extension and user data 4. At the beginning of the extension and user data 4, user data start code having the length of four bytes is placed. The user data start code is followed by user data area. The user data area contains information corresponding to SMPTE standard.

The header portion of the sequence layer is followed by a header portion of the GPO layer. The header portion contains GPO header 6 having the length of eight bytes. The GOP header 6 is followed by extension and user data 7. At the beginning of the extension and user data 7, user data start code having the length of four bytes is placed. The user data start code is followed by user data area. The user data area contains information necessary for having compatibility with another conventional video format.

The header portion of the GOP layer is followed by a header portion of the picture layer. The header portion contains picture header 9 having the length of nine bytes. The picture header 9 is followed by picture encoding extension 10 having the length of nine bytes. The picture encoding extension 10 is followed by extension and user data 11. The first 133 bytes of the extension and user data 11 are extension and user data. The extension and user data is followed by user data start code 15 having the length of four bytes. The user data start code 15 is followed by information necessary for having compatibility with another conventional video format. The information is followed by user data start code. The user data start code is followed by data corresponding to SMPTE standard. The header portion of the picture layer is followed by slices.

Next, a macro block will be further described. Each macro block contained in the slice layer is a set of a plurality of DCT blocks. An encoded sequence of DCT blocks is composed of sets of runs and levels. A run represents the number of 0s as a quantized DCT coefficient. A level is immediately preceded by a run. A level represents a non-zero value as a quantized DCT coefficient. Neither each macro block nor each DCT block contained in each macro block contains identification code arranged in bytes.

A macro block is formed by dividing one screen (picture) into a lattice of 16 pixels×16 lines. A slice is formed by connecting macro blocks for example in the horizontal direction. The last macro block of one slice is continued to the first macro block of the next slice. Macro blocks between two slices are prohibited from being overlapped. The number of macro blocks per screen depends on the size thereof.

The number of macro blocks in the vertical direction of a screen is referred to as mb_height, whereas the number of macro blocks in the horizontal direction of a screen is referred to as mb_width. The coordinates of a macro block are defined as mb_height and mb_column. mb_height is the vertical position number of the current macro block counted from the upper edge of the screen, the upper edge being 0. mb_column is the horizontal position number of the current macro block counted from the left edge of the screen, the left edge being 0. The position of a macro block on the screen is represented with one variable as macroblock_address=mb_row×mb_width+mb_column.

The order of slices and macro blocks of a stream is defined with macroblock_address. In other words, a stream is transmitted in the downward direction and leftward direction of the screen.

In MPEG, normally, one slice is composed of one stripe (16 lines). The variable length encoding starts at the left edge of the screen and ends at the right edge of the screen. Thus, when a VTR has recorded an MPEG elementary stream, if it is reproduced at high speed, the VTR mainly reproduces the left edge of the screen. Thus, the screen cannot be equally updated. In addition, since the position on the tape cannot be predicted, if a tape pattern is traced at predetermined intervals, the screen cannot be equally updated. Moreover, if at least one error takes place, it adversely affects up to the right edge of the screen. Thus, until the next slice header is detected, the error continues. Consequently, one slice is composed of one macro block.

FIG. 15 shows an example of the structure of the record side of a recording and reproducing apparatus according to the embodiment of the present invention. When the recording operation is performed, a digital signal is input from a terminal 100. The digital signal is supplied to an SDI (Serial Data Interface) receiving portion 101. The SDI is an interface defined by SMPTE so that a (4:2:2) component video signal, a digital audio signal, and additional data can be transmitted. The SDI receiving portion 101 extracts a digital video signal and a digital audio signal from the input digital signal. The digital video signal is supplied to an MPEG encoder 102. The digital audio signal is supplied to an ECC encoder 109 through a delay 103. The delay 103 absorbs the time difference between the digital audio signal and the digital video signal.

In addition, the SDI receiving portion 101 extracts a synchronous signal from the input digital signal. The extracted synchronous signal is supplied to a timing generator 104. Alternatively, an external synchronous signal may be input from a terminal 105 to the timing generator 104. The timing generator 104 generates timing pulses corresponding to a designated signal of the input synchronous signal and a synchronous signal supplied from a SDTI receiving portion 108 (that will be described later). The generated timing pulses are supplied to each portion of the recording and reproducing apparatus.

The MPEG encoder 102 performs a DCT (Discrete Cosine Transform) process for the input video signal so as to transform the input video signal into coefficient data and then encode the coefficient data with variable-length code. The variable-length code encoded (VLC) data is an elementary stream (ES) corresponding to the MPEG2. The output is supplied to one of input terminals of a record side multi-format converter (referred to as MFC) 106.

On the other hand, data in SDTI (Serial Data Transport Interface) format is input from an input terminal 107. The signal is synchronously detected by an SDTI receiving portion 108. Thereafter, the signal is buffered in a buffer and then the elementary stream is extracted therefrom. The extracted elementary stream is supplied to another input terminal of the record side MFC 106. The synchronous signal that has been synchronously detected by the SDTI receiving portion 108 is supplied to the above-described timing generator 104.

According to the embodiment, to transmit an MPEG ES (MPEG elementary stream), for example SDTI (Serial Data Transport Interface)-CP (Content Package) is used. The ES is 4:2:2 components. In addition, the ES is a stream composed of only I pictures. Moreover, the ES has the relation of 1 GOP=1 picture. In the SDTI-CP format, the MPEG ES is separated into access units and packed to packets corresponding to frames. In the SDTI-CP format, a sufficient transmission band (27 MHz or 36 MHz of clock rate or 270 Mbps or 360 Mbps of stream bit rate) is used. Thus, in one frame period, the ES can be transmitted as a burst.

In the area after SAV until EAV of one frame period, system data, video stream, audio stream, and AUX data are placed. Data is not equally placed in the entire frame period. Instead, in a predetermined period from the beginning, data is placed as a burst. At the boundary of a frame, an SDTI-CP stream (video and audio) can be switched in the form of a stream. In the SDTI-CP format, when contents use SMPTE time code corresponding to the clock, audio is synchronized with video. In addition, it is defined that SDTI-CP and SDI coexist.

As in the case that a TS (Transport Stream) is transferred, the above-described interface corresponding to the SDTI-CP format does not need to cause an SDTI-CP stream to flow to a VBV (Video Buffer Verifier) buffer and TBs (Transport Buffers) of the encoder and the decoder. Thus, the delay of the stream can be decreased. In addition, since the SDTI-CP format allows a stream to be transferred at very high rate, the delay can be further decreased. Thus, in an environment of which there is a synchronization in the entire broadcasting station, the SDTI-CP format can be effectively used.

The SDTI receiving portion 108 further extracts a digital audio signal from the input SDTI-CP stream. The extracted digital audio signal is supplied to the ECC encoder 109.

The record side MFC 106 contains a selector and a stream converter. The record side MFC 106 is disposed in for example one integrated circuit. Next, the process performed by the record side MFC 106 will be described. An MPEG ES supplied from the MPEG encoder 102 or an MPEG ES supplied from the SDTI receiving portion 108 is selected by the selector. The selected MPEG stream is processed by the record side MFC 106.

The record side MFC 106 rearranges DCT coefficients of individual DCT blocks of one macro block arranged corresponding to the MPEG2 standard to DCT coefficients over all DCT blocks corresponding to frequency components. In addition, when one slice of an elementary stream is composed of one stripe, the record side MFC 106 converts the elementary stream so that one slice is composed of one macro block. Moreover, the record side MFC 106 limits the maximum length of the variable length data that takes place in one macro block to a predetermined length. This process is performed by designating 0 to high order DCT coefficients. Moreover, the record side MFC 106 performs an interpolating process for the header of the sequence layer and the quantizing matrix for each picture of the MPEG bit stream. The converted elementary stream rearranged by the record side MFC 106 is supplied to the ECC encoder 109.

A main memory having a large storage capacity (not shown) is connected to the ECC encoder 109. The ECC encoder 109 comprises a packing and shuffling portion, an audio outer code encoder, a video outer code encoder, a video inner code encoder, an audio shuffling portion, a video shuffling portion, and so forth. The ECC encoder 109 comprises an ID adding circuit and a synchronous signal adding circuit. The ID adding circuit adds an ID to each sync block. The ECC encoder 109 is composed of for example one integrated circuit.

According to the embodiment, error correction code used for video data and audio data is product code of which the video data or audio data is encoded with outer code in the vertical direction of a two dimensional array and the video data or audio data is encoded with inner code in the horizontal direction of the two dimensional array. Thus, with the product code, data symbols are dually encoded. As the outer code and inner code, Reed-Solomon code can be used.

Next, the process performed by the ECC encoder 109 will be described. Since video data of a converted elementary stream has been encoded with variable length code, the data length of each macro block varies. The packing and shuffling portion packs each macro block in a fixed length. When a macro block cannot be packed in the fixed length, the overflow portion is packed to other areas that have spaces against the fixed length.

In addition, system data containing information about picture format, version of shuffling pattern, and so forth is supplied from a system controller 121 (that will be described later). The system data is input from an input terminal (not shown). The system data is supplied to the packing and shuffling portion. The packing and shuffling portion performs a record process for the system data as with picture data. The system data is recorded as video AUX. In addition, the packing and shuffling portion rearranges macro blocks of one frame that are generated in the scanning order and performs a shuffling process for dispersing the record positions of the macro blocks on the tape. Since the macro blocks are shuffled, even if data is partly reproduced when it is reproduced at high speed, the update ratio of the picture can be improved.

The video data and system data supplied from the packing and shuffling portion (unless otherwise specified, even if video data contains system data, the video data is simply referred to as video data) is supplied to the video outer code encoder that encodes video data with outer code. The video outer code encoder adds an outer code parity to the video data. An output of the outer code encoder is supplied to the video shuffling portion. The video shuffling portion performs a shuffling process for the output of the outer code encoder so as to change the order of sync blocks over a plurality of ECC blocks. Since sync blocks are shuffled, an error can be prevented from concentrating on a particular ECC block. The shuffling process performed by the shuffling portion may be referring to interleave. An output of the video shuffling portion is written to the main memory.

On the other hand, as was described above, a digital audio signal that is output from the SDTI receiving portion 108 or the delay 103 is supplied to the ECC encoder 109. According to the embodiment, non-compressed digital audio signal is handled. Alternatively, the digital audio signal may be input through an audio interface. In addition, audio AUX is supplied from an input terminal (not shown). The audio AUX is auxiliary data that contains information about audio data such as sampling frequency. The audio AUX is added to audio data and treated in the same manner as audio data.

Audio data to which the audio AUX has been added (unless otherwise specified, referred to as audio data) is supplied to the audio outer code encoder that encodes audio data with outer code. An output of the audio outer code encoder is supplied to an audio shuffling portion. The audio shuffling portion shuffles the audio data. The audio shuffling portion shuffles the audio data for each sync block and for each channel.

An output of the audio shuffling portion is written to a main memory. As was described above, the output of the video shuffling portion is also written to the main memory. The main memory mixes the audio data and the video data as data of one channel.

Data is read from the main memory. An ID that represents information of a sync block number is added to the data. The resultant data is supplied to the inner code encoder. The inner code encoder encodes the supplied data with inner code. A synchronous signal is added to an output of the inner code encoder for each sync block. As a result, record data as successive sync blocks is formed.

Record data that is output from the ECC encoder 109 is supplied to an equalizer 110 that includes a recording amplifier and so forth. The equalizer 110 converts the supplied data into a record RF signal. The record RF signal is supplied to a rotating drum 111 on which a rotating head is disposed at a predetermined position and then recorded on the magnetic tape 112. In reality, a plurality of magnetic heads are disposed in such a manner that azimuths of heads that form adjacent tracks are different.

When necessary, a scrambling process may be performed for the record data. When digital data is recorded, it may be digitally modulated. Moreover, partial response class 4 and Viterbi encoding may be used. The equalizer 110 contains both the structure for the record side and the structure for the reproduction side.

Figure 16A:
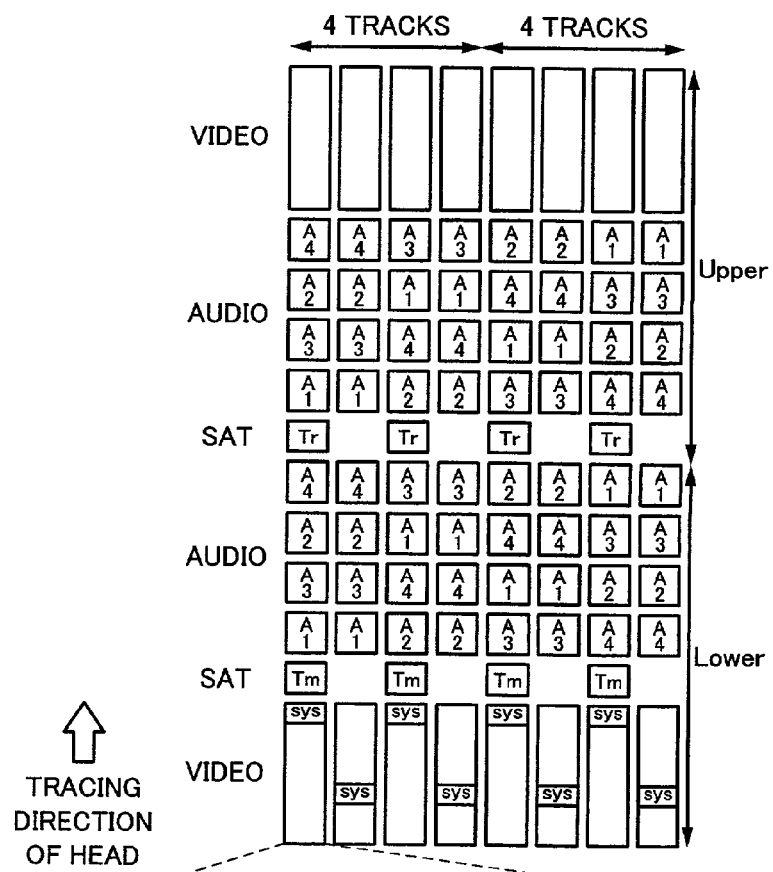
FIG. 16 is a schematic diagram showing an example of a format of tracks formed on a magnetic tape.

FIG. 16 shows a track format in the case that an interlaced video signal whose frame frequency is 29.97 Hz and whose size is 720 pixels (the number of effective horizontal pixels)×480 lines (the number of effective lines) and PCM audio signals of four channels are recorded on a magnetic tape with a rotating head. In the example, video data and audio data for one frame are recorded with four tracks. Two tracks having different azimuths are paired. On each track, a record area for audio data (namely, audio sector) is formed at a nearly center portion. A video record area (video sector) is formed on both sides of the audio sector.

In the example, audio data of four channels can be handled. A1 to A4 represent channels 1 to 4 of audio data, respectively. Audio data is recorded in such a manner that the arrangement of audio data is changed in each set of two tracks having different azimuths. In the example, video data for four error correction blocks per track is interleaved. The interleaved data is divided into an upper side sector and a lower side sector and recorded.

The lower side video sector has a system area (SYS) at a predetermined position. The system area is alternately formed on the beginning side and the end side of the lower side video sector of each track.

In FIG. 16, SAT is an area in which a servo lock signal is recorded. Between each area, a gap having a predetermined size is formed.

In FIG. 16, data for each frame is recorded with four tracks. Depending on the format of data that is recorded and reproduced, data for each frame may be recorded with eight tracks per frame, six tracks per frame, and so forth.

Figure 16B:
Figure 16C:

As shown in FIG. 16B, data recorded on the tape is composed of a plurality of blocks formed at equal intervals. These blocks are referred to as sync blocks. FIG. 16C shows an outline of the structure of a sync block. A sync block is composed of sync pattern, ID, DID, data packet, and error correction inner code parity. The SYNC pattern is used to detect synchronization. The ID is used to identify the current sync block. The DID is used to represent the content of data that follows. Data is treated as packets corresponding to sync blocks. In other words, the minimum unit of data that is recorded or reproduced is one sync block. Many sync blocks (see FIG. 16B) compose for example a video sector.

Returning to the description of FIG. 15, when a signal is reproduced from the magnetic tape 112, the signal reproduced from a magnetic tape 112 by the rotating drum 111 is supplied to a reproduction side structure of the equalizer 110 that includes a reproducing amplifier. The equalizer 110 performs an equalizing process, a waveform trimming process, and so forth for the reproduced signal. When necessary, the equalizer 110 performs a demodulating process, a Viterbi decoding process, and so forth for the reproduced signal. An output of the equalizer 110 is supplied to an ECC decoder 113.

The ECC decoder 113 performs the reverse process of the ECC encoder 109. The ECC decoder 113 comprises a main memory, an inner code decoder, an audio deshuffling portion, a video deshuffling portion, and an outer code decoder. The main memory has a large storage capacity. The ECC decoder 113 comprises a video deshuffling and depacking portion and a video data interpolating portion. Likewise, the ECC decoder 113 comprises an audio AUX separating portion and an audio data interpolating portion. The ECC decoder 113 is composed of for example one integrated circuit.

Next, the process performed by the ECC decoder 113 will be described. The ECC decoder 113 detects synchronization. In other words, the ECC decoder 113 detects a synchronous signal added at the beginning of a sync block and extracts a sync block. Each sync block of the reproduction data is supplied to the inner code decoder. The inner code decoder corrects an error of a sync block with inner code. For an output of the inner code decoder, an ID interpolating process is performed. The ID (for example, the sync block number) of a sync block from which an error is detected with inner code is interpolated. The resultant reproduced data is separated into video data and audio data.

As was described above, the video data represents both DCT coefficient data generated in the MPEG intra-encoding process and system data. Likewise, the audio data represents PCM (Pulse Code Modulation) data and audio AUX.

The separated audio data is supplied to the audio deshuffling portion. The audio deshuffling portion performs the reverse process of the shuffling process performed by the record side shuffling portion. An output of the deshuffling portion is supplied to the audio outer code decoder. The outer code decoder corrects an error of the audio data with outer code. The audio outer code decoder outputs error-corrected audio data. When an error of audio data cannot be corrected, an error flag is set.

An output of the audio outer code decoder is supplied to the audio AUX separating portion. The audio AUX separating portion separates audio AUX from the audio data that is output from the audio outer code decoder. The separated audio AUX is output from the ECC decoder 113 (the route is not shown). The audio AUX is supplied to the data interpolating portion (that will be described later). The data interpolating portion interpolates a sample containing an error. The interpolating method is for example average value interpolating method, preceding value hold method, or the like. In the average value interpolating method, a sample containing an error is interpolated with an earlier correct sample and a later correct sample. In the preceding value hold method, a preceding correct value is held.

An output of the data interpolating portion is an output of audio data that is output from the ECC decoder 113. The audio data that is output from the ECC decoder 113 is supplied to a delay 117 and an SDTI output portion 115. The delay 117 absorbs the delay in the process for video data performed in an MPEG decoder 116 (that will be described later). The delay 117 delays the audio data by a predetermined time period and supplies the delayed audio data to an SDI output portion 118.

The separated video data is supplied to the deshuffling portion. The deshuffling portion performs the reverse process of the shuffling process performed by the record side shuffling portion. The deshuffling portion restores the sync blocks shuffled by the record side shuffling portion to the original sync blocks. An output of the deshuffling portion is supplied to the outer code decoder. The outer code decoder corrects an error of each sync block with outer code. When an uncorrectable error takes place, an error flag that represents that there is an error is set.

An output of the outer code decoder is supplied to the deshuffling and depacking portion. The deshuffling and depacking portion restores macro blocks shuffled by the record side packing and shuffling portion to the original macro blocks. In addition, the deshuffling portion and depacking portion depacks packed macro blocks. In other words, the deshuffling portion and depacking portion restores fixed length code of each macro block to the original variable length code. In addition, the deshuffling and depacking portion separates the system data from the video data. The system data is output from the ECC decoder 113 and supplied to a system controller 121 (that will be described later).

An output of the deshuffling and depacking portion is supplied to the data interpolating portion. The data interpolating portion corrects data to which an error flag has been set (namely, data having an error). In other words, before the conversion is performed, if macro block data has an error, DCT coefficients of frequency components after the position of the error cannot be corrected. In such a case, for example, data at the position of the error is substituted with block end code (EOB) so that DCT coefficients of the subsequent frequency components become zero. Likewise, when video data is reproduced at high speed, only DCT coefficients corresponding to the sync block length are restored. The other coefficients are substituted with zero data. In addition, the data interpolating portion performs a header recovering process for a header at the beginning of video data (sequence header, GOP header, picture header, user data, and so forth) when the header has an error.

Since DCT coefficients are arranged from DC components to higher frequency components over all DCT blocks, even if DCT coefficients after a particular point are omitted, DC components and lower frequency components can be equally placed in individual DCT blocks that compose a macro block.

Video data that is output from the data interpolating portion of the ECC decoder 113 is supplied as an output of the ECC decoder 113. The outputs of the ECC decoder 113 are supplied to a reproduction side multi-format converter (hereinafter abbreviated to reproduction side MFC) 114. The reproduction side MFC 114 performs the reverse process of the above-described record side MFC 106. The reception side MFC 114 includes a stream converter. The reception side MFC 114 is composed of for example one integrated circuit.

The stream converter performs the reverse process of the record side stream converter. In other words, the stream converter rearranges DCT coefficients arranged over a plurality of DCT blocks corresponding to frequency components to DCT coefficients in each DCT block. Thus, the reproduced signal is converted into an MPEG2 elementary stream.

On the other hand, as with the record side, the input and output of the stream converter should have a sufficient transmission rate (band width) corresponding to the maximum length of macro blocks. When the length of each macro block (slice) is not limited, it is preferred to secure the band width three time larger than the pixel rate.

An output of the stream converter of the reception side MFC 114 is an output of the reception side MFC 114. The output of the reception side MFC 114 is supplied to the SDTI output portion 115 and the MPEG decoder 116.

The MPEG decoder 116 decodes the elementary stream and outputs video data. The elementary stream is supplied to the MPEG decoder 116. The MPEG decoder 116 performs a pattern matching for the elementary stream and detects sequence header code and start code therefrom. Corresponding to the detected sequence header code and start code, the MPEG decoder 116 extract encoding parameters contained in the header portion of each layer. Corresponding to the extracted encoding parameters, the MPEG decoder 116 performs an inverse quantizing process and an inverse DCT process for the elementary stream.

The decoded video data that is output from the MPEG decoder 116 is supplied to the SDI output portion 118. As described above, the audio data that has been separated from the video data by the ECC decoder 113 is supplied to the SDI output portion 118 through the delay 117. The SDI output portion 118 maps the supplied video data and audio data in the SDI format and outputs a stream having the data structure of the SDI format. The stream is output from the SDI output portion 118 to the outside through an output terminal 120.

On the other hand, the audio data separated from the video data by the ECC decoder 113 is supplied to the SDTI output portion 115. The SDTI output portion 115 maps the video data and audio data to the SDTI format so as to converts them to a stream having a data structure of the SDTI format. The converted stream is output to the outside through an output terminal 119.

When an external device to which an SDTI stream has been supplied from the output terminal 119 needs to perform an MPEG decoding process, the external device performs a pattern matching for the supplied stream, detects sequence start code and start code, and extracts encoding parameters of the header portion of each layer. Corresponding to the extracted encoding parameters, the external device decodes the supplied SDTI stream.

In FIG. 15, the system controller 121 is composed of for example a micro computer. The system controller 121 controls the entire operations of the recording and reproducing apparatus. A servo 122 communicates with the system controller 121 so as to control the traveling of the magnetic tape 112 and the driving of the rotating drum 111.

Figure 17A:
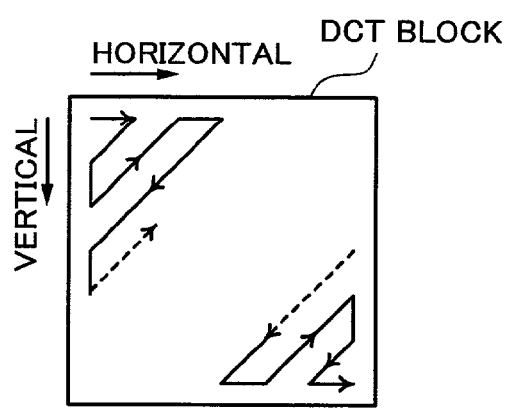
FIG. 17 is a schematic diagram for explaining an output method and a variable length encoding of a video encoder.
Figure 17B:
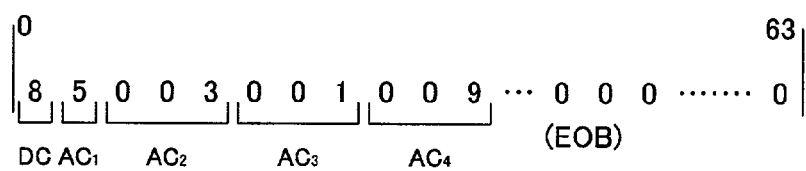

FIG. 17A shows the order of DCT coefficients of video data that is output from the DCT circuit of the MPEG encoder 102. This order applies to an MPEG ES that is output from the SDTI receiving portion 108. In the following description, an output of the MPEG encoder 102 will be described as an example. DCT coefficients are zigzag-scanned and output starting from the upper left DC component of the DCT block in the directions of which horizontal and vertical spatial frequencies become high. Thus, as shown in FIG. 17B, a total of 64 (8 pixels×8 lines) DCT coefficients are arranged in the order of frequency components.

The DCT coefficients are variable-length encoded by the VLC portion of the MPEG encoder. In other words, the first coefficient is fixed as a DC component. The next components (AC components) are assigned code corresponding to sets of runs of zeros and levels. Thus, the variable length code encoded output of coefficient data of AC components is a sequence of $AC_1, AC_2, AC_3, \ldots$ and so forth in the order from lower frequency (low order) components to higher frequency (high order) components. The elementary stream contains variable length code encoded DCT coefficients.

The record side stream converter that is built in the record side MFC 106 rearranges DCT coefficients of the supplied signal. In other words, the DCT coefficients arranged in the order of frequency components in each DCT block by the zigzag scanning are rearranged in the order of frequency components over all DCT blocks that composes the macro block.

FIG. 18 shows an outline of the rearrangement of DCT coefficients performed by the record side stream converter. In the case of a (4:2:2) component signal, one macro block is composed of four DCT blocks ($Y_1, Y_2, Y_3,$ and $Y_4$) of the luminance signal Y, two DCT blocks ($Cb_1$ and $Cb_2$) of the color difference signal Cb, and two DCT blocks ($Cr_1$ and $Cr_2$) of the color difference signal Cr.

Figure 18A:
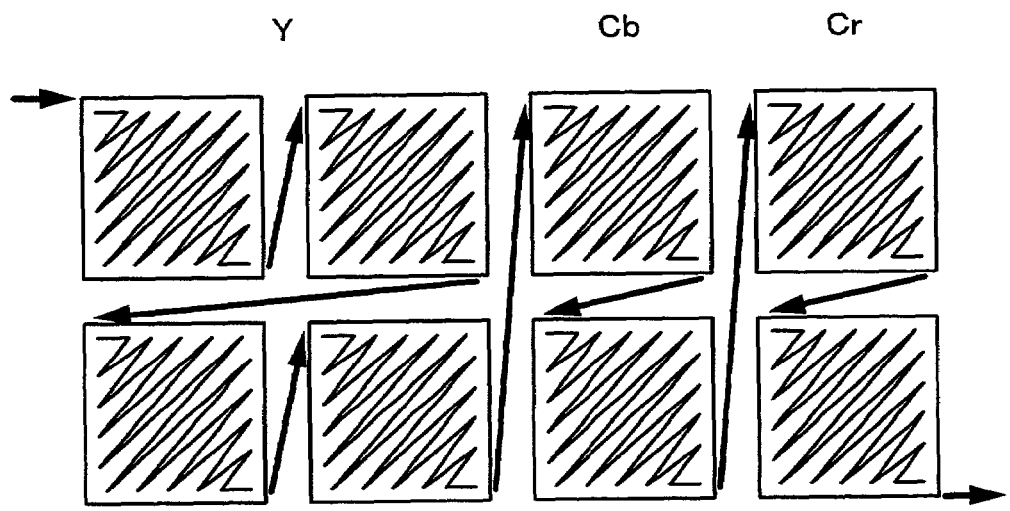
FIG. 18 is a schematic diagram for explaining the rearrangement of an output sequence of the video encoder.

As was described above, the MPEG encoder 102 zigzag-scans DCT coefficients corresponding to the MPEG2 standard. As shown in FIG. 18A, DCT coefficients are arranged in the order of a DC component and AC components from the lowest frequency component to the highest frequency component for each DCT block. After one DCT block has been zigzag-scanned, the next DCT block is zigzag-scanned. Likewise, DCT coefficients are arranged.

In other words, in a macro block, in each of the DCT blocks $Y_1, Y_2, Y_3,$ and $Y_4$ and the DCT blocks $Cb_1, Cb_2, Cr_1,$ and $Cr_2$, DCT coefficients are arranged in the order of a DC component and AC components from the lowest frequency component to the highest frequency component. Variable length code encoding is performed in such a manner that sets of runs and levels are assigned code such as [DC, $AC_1, AC_2, AC_3, \ldots$].

Figure 18B:
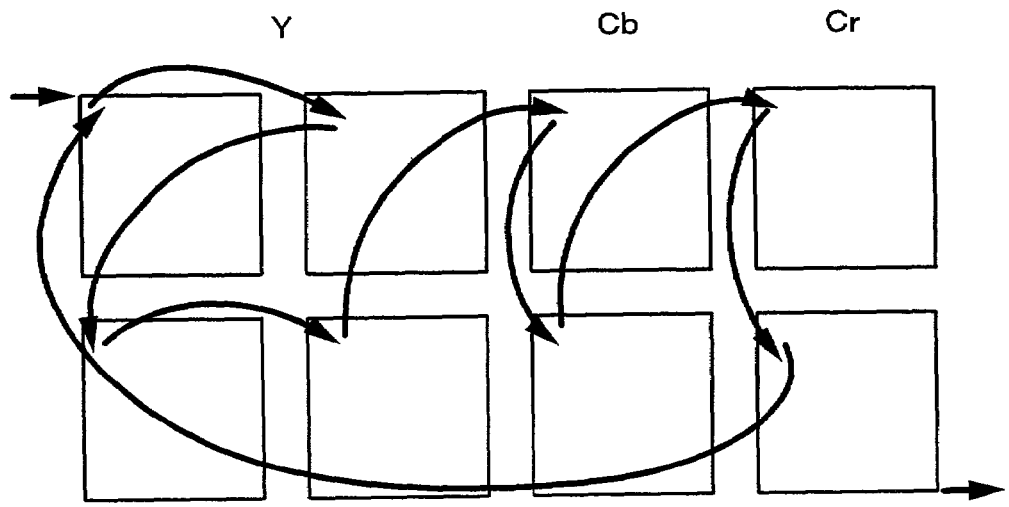

The record side stream converter interprets the DCT coefficients encoded with variable length code, detects the delimitation of each coefficient, and arranges DCT coefficients over all DCT blocks of the macro block corresponding to frequency components. FIG. 18B shows such a process.

Firstly, the stream converter arranges DC components over eight DCT blocks of the macro blocks. Thereafter, the stream converter arranges the lowest frequency AC components over the eight DCT blocks. Likewise, the stream converter arranges AC coefficient data over the eight DCT blocks corresponding to each order component.

The coefficient data is rearranged in the order of DC ($Y_1$), DC ($Y_2$), DC ($Y_3$), DC ($Y_4$), DC ($Cb_1$), DC ($Cr_1$), DC ($Cb_2$), DC ($Cr_2$), $AC_1$ ($Y_1$), $AC_1$ ($Y_2$), $AC_1$ ($Y_3$), $AC_1$ ($Y_4$), $AC_1$ ($Cb_1$), $AC_1$ ($Cr_1$), $AC_1$ ($Cb_2$), $AC_1$ ($Cr_2$), ... and so forth. As was described with reference to FIG. 17, DC, $AC_1$, $AC_2$, ..., and so forth are variable length code assigned to sets of runs and levels.

The converted elementary stream of which the order of coefficient data has been changed by the record side stream converter is supplied to the packing and shuffling portion of the ECC encoder 109. The data length of each macro block of the converted elementary stream is the same as the data length of each macro block of non-converted elementary stream. In addition, although the MPEG encoder 102 fixes the length of each GOP (one frame) by the bit rate control, the length of each macro block varies. The packing and deshuffling portion packs data of the macro block to a fixed length.

FIG. 19 shows an outlines of a packing process for macro blocks performed by the packing and shuffling portion. Macro blocks are packed to a predetermined fixed length. The fixed length corresponds to the data length of a sync block that is the minimum unit of data that is recorded and reproduced. Thus, the shuffling and error correction code encoding process can be easily performed. For simplicity, in FIG. 19, it is assumed that one frame contains eight macro blocks.

Figure 19A:
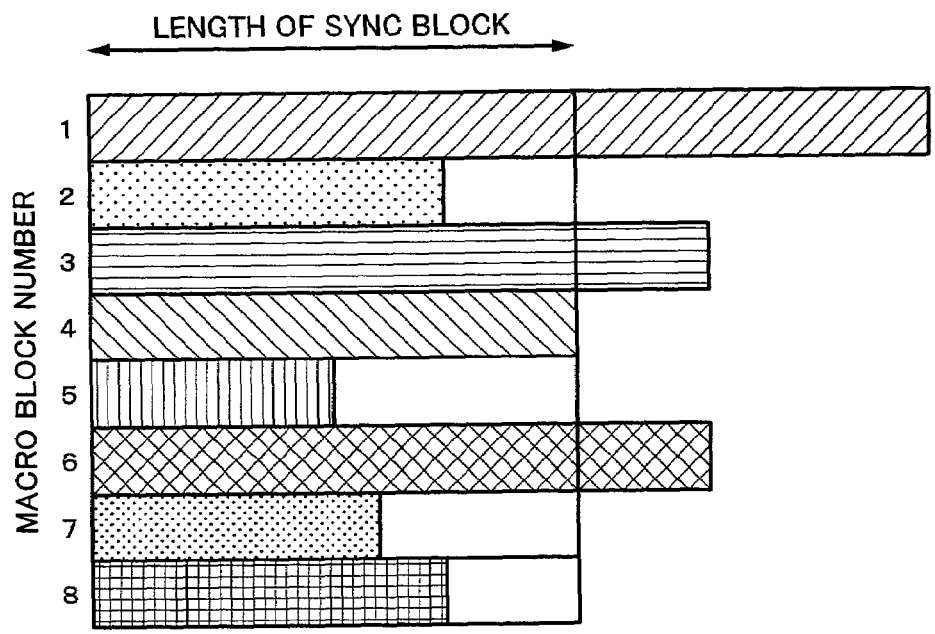
FIG. 19 is a schematic diagram for explaining a process for packing the sequence rearranged data to sync blocks.

As shown in FIG. 19A, since the variable length encoding process is performed for eight macro blocks, their lengths are different each other. In this example, the length of each of macro blocks #1, #3, and #6 is larger than the fixed length as the length of the data area of one sync block. The length of each of macro blocks #2, #5, #7, and #8 is smaller than the fixed length. The length of macro block #4 is almost equal to the length of one sync block.

Figure 19B:
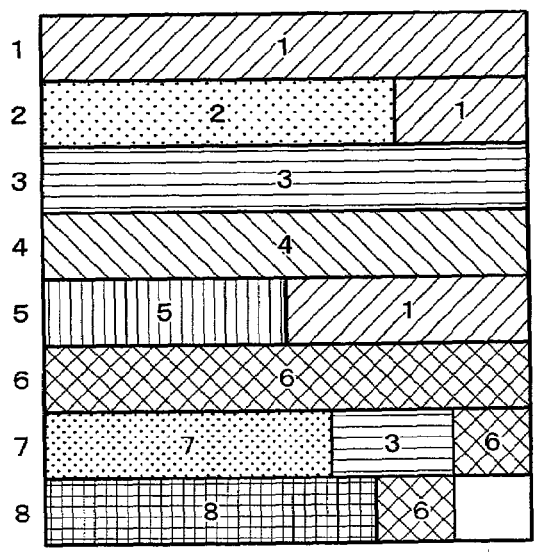

The packing process packs a macro block to the fixed length of the length of one sync block. This is because the amount of data generated in one frame period is fixed. As shown in FIG. 19B, when the length of a macro block is longer than the length of one sync block, the macro block is divided at the position of the length of one sync block. The portion that exceeds the length of one sync block (namely, overflow portion) is successively packed to macro blocks each of which does not exceed the length of one sync block in such a manner that the overflow portion is preceded by those macro blocks.

In the example shown in FIG. 19B, in the macro block #1, the portion that exceeds the length of one sync block is packed after the macro block #2. When the length of the resultant macro block #2 becomes the same as the length of one sync block, the remaining portion is packed after the macro block #5. Next, in the macro block #3, the portion that exceeds the length of one sync block is packed after the macro block #7. Thereafter, in the macro block #6, the portion that exceeds the length of one sync block is packed after the macro block #7. The remaining portion is packed after the macro block #8. In such a manner, each macro block is packed to the fixed length as the length of one sync block.

The record side stream converter can predetermine the length of variable length data of each macro block in advance. Thus, the packing portion can know the end of data of each macro block without need to decode VLC data and check the content.

Figure 25A:
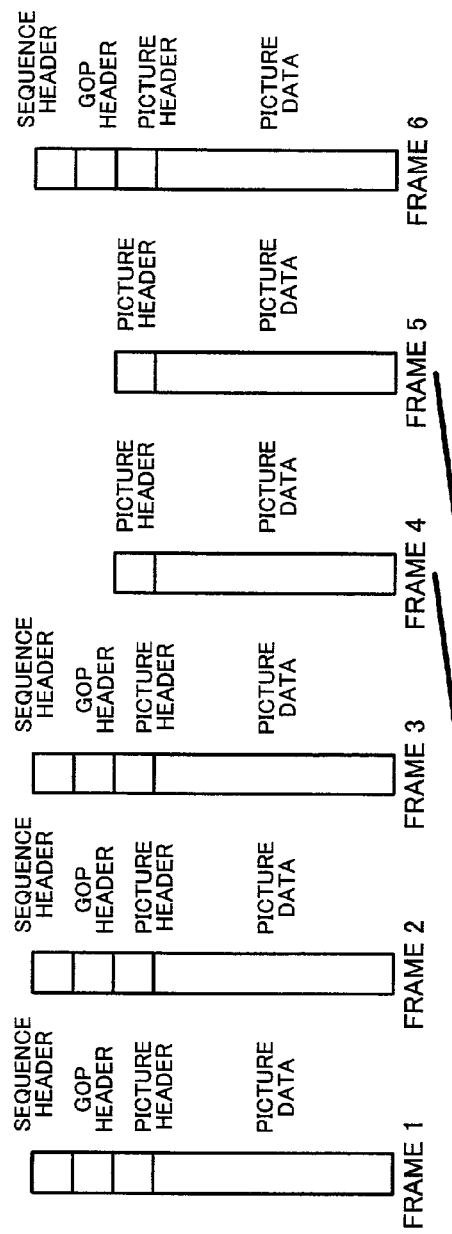
FIG. 25 is a schematic diagram for explaining a problem solved by the present invention.
Figure 25B:
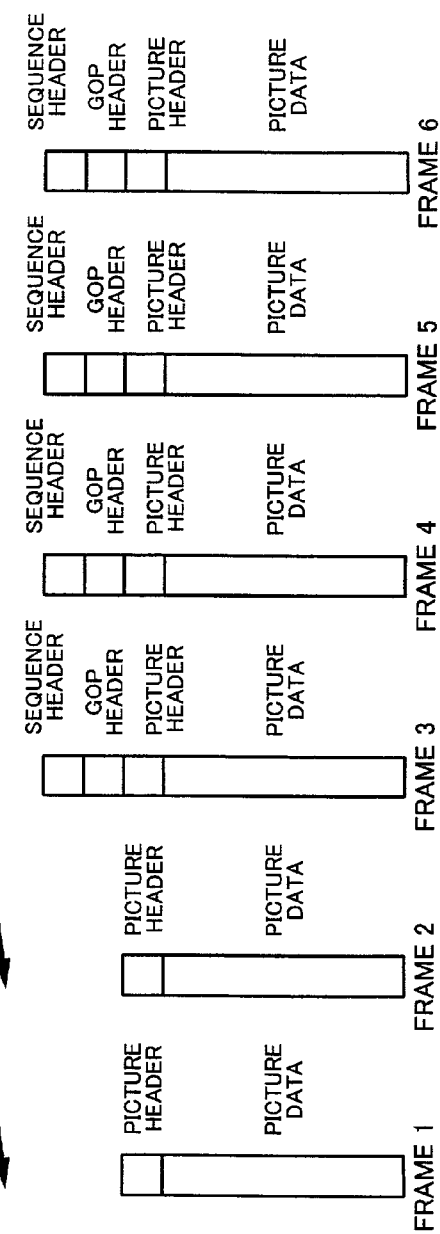

FIG. 20 shows the packing process for data for one frame in more detail. In the shuffling process, macro blocks from MB1 to MB4 dispersed on the screen as shown in FIG. 20A are successively arranged as shown in FIG. 25B. The header of the sequence layer and the header of the picture layer are added to each frame. The header portion composed of such headers is treated as a top macro block and packed. As shown in FIG. 20C, the overflow portion that extrudes from the fixed length (sync block length) is packed to areas that have a space. In FIG. 25B, the overflow portions are denoted by 300, 301, and 302. The packed data in such a manner is recorded on the magnetic tape 112 as shown in FIG. 20D.

In the high speed reproducing operation of which a magnetic tape is traveled at a higher speed than the recording operation, the rotating head traces a plurality of tracks at a time. Thus, the reproduced data contains data of different frames. When the reproducing operation is performed, the depacking process is performed in the reverse manner as the packing process. When the depacking process is performed, all data for one frame should have been arranged. When data of a plurality of frames is mixed as in the high speed reproducing mode, the depacking process cannot be performed. Thus, in the high speed reproducing operation, only data that does not protrude from the fixed length is used rather than overflow data.

Figure 21:
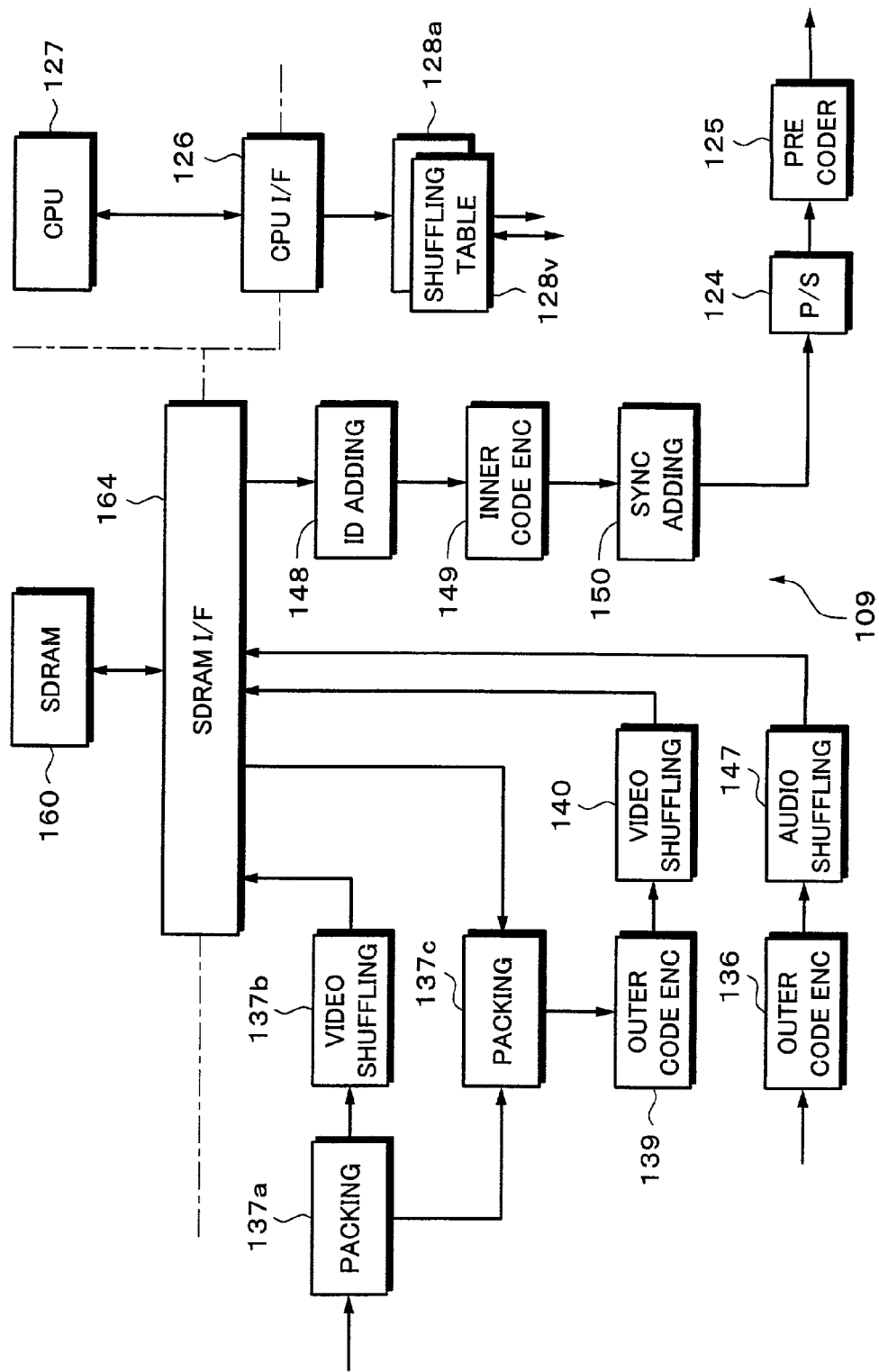
FIG. 21 is a block diagram showing a more practical structure of an ECC encoder.

FIG. 21 shows a more practical structure of the above-described ECC encoder 109. In FIG. 21, reference numeral 164 is an interface for an external main memory 160 connected to the IC. The main memory 160 is composed of an SD RAM. The interface 164 arbitrates a request from the ECC encoder 109 to the main memory 160 and performs a read/write process from and to the main memory 160. In addition, a packing portion 137a, a video shuffling portion 137b, and a packing portion 137c compose a packing and shuffling portion.

Figure 22:
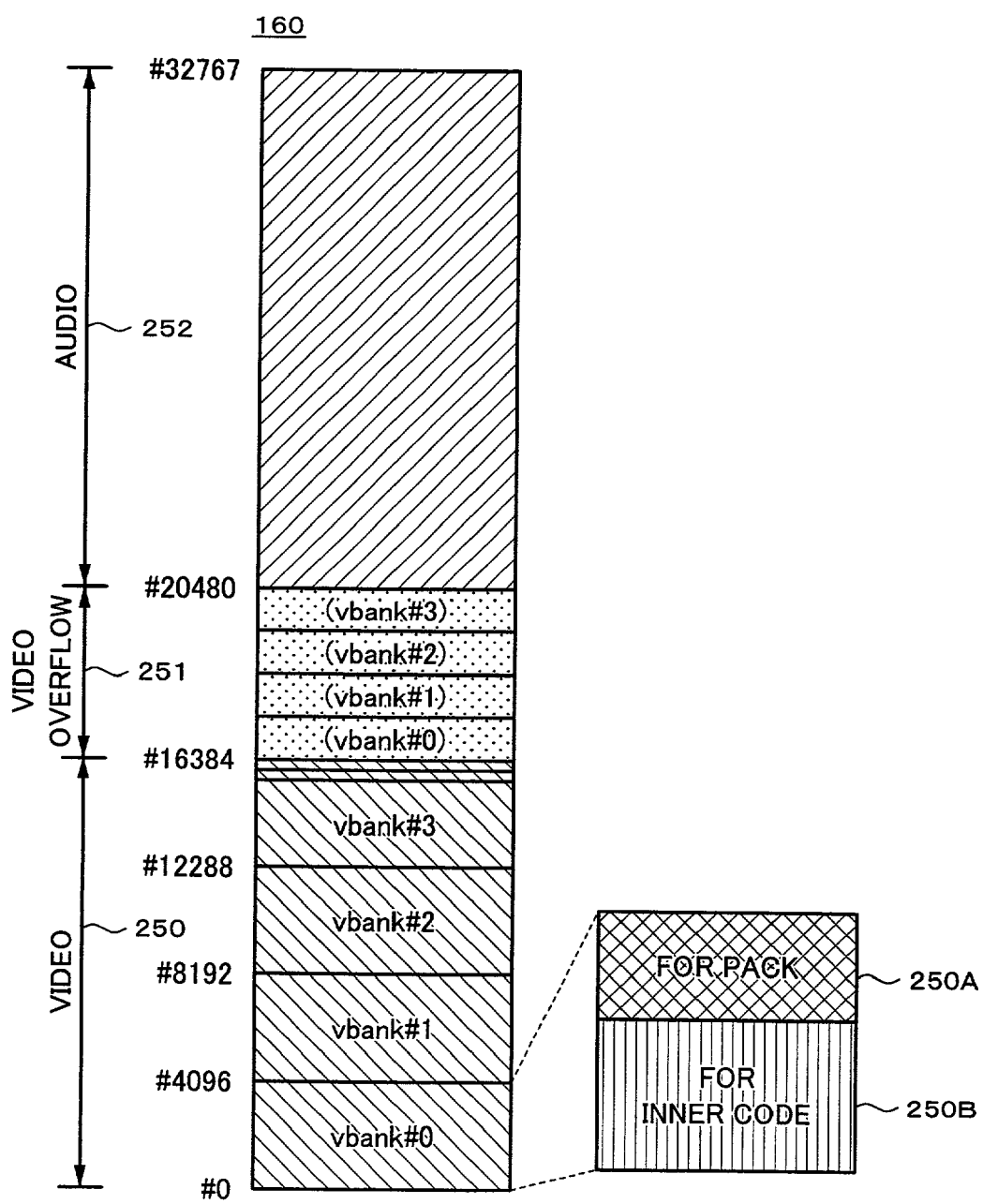
FIG. 22 is a schematic diagram showing an example of an address structure of a main memory.

FIG. 22 shows an example of the address structure of the main memory 160. The main memory 160 is composed of for example a 64-Mbit SDRAM. The main memory 160 comprises a video area 250, an overflow area 251, and an audio area 252. The video area 250 is composed of four banks (vbank #0, vbank #1, vbank #2, and vbank #3). Each of the four banks can store a digital video signal for one fixed length unit. One fixed length unit is a unit of which the amount of generated data is controlled to an almost target value. One equal length unit is for example one picture (I picture) of a video signal. In FIG. 22, portion A represents a data portion of one sync block of a video signal. One sync block contains data of bytes that depend on the format that is used. To deal with a plurality of formats, the data size of one sync block is larger than the maximum number of bytes of sync blocks of individual formats. For example, the number of bytes of one sync block is 256 bytes.

Each bank of the video area is divided into a packing area 250A and an inner code encoder output area 250B. The overflow area 251 is composed of four banks corresponding to the above-described video area. The main memory 160 has an audio data processing area 252.

According to the embodiment, with reference to a data length sign of each macro block, the packing portion 137a stores the fixed length data and overflow data that exceeds the fixed length to different areas of the main memory 160. The fixed length data is data that does not exceed the length of the data area of a sync block. Hereinafter, the fixed length data is referred to as block length data. The block length data is stored in the packing area 250A of each bank. When the length of a macro block is smaller than the block length, the corresponding area of the main memory 160 has a blank region. The video shuffling portion 137b controls the write addresses so as to shuffle macro blocks. The video shuffling portion 137b shuffles only block length data rather than overflow portions. The overflow portions are written to an area assigned to the overflow data.

Next, the packing portion 137c packs overflow portions to a memory of an outer code encoder 139. In other words, the packing portion 137c reads data having the block length from the main memory 160 to a memory for one ECC block of the outer code encoder 139. When the block length data has a blank region, the packing portion 137c packs the overflow portion to the block length data having the blank region. After the packing portion 137c has read data for one ECC block, it temporarily stops reading data. The outer code encoder 139 generates an outer code parity. The outer code parity is stored to the memory of the outer code encoder 139. After the outer code encoder 139 has completed the process for one ECC block, data and outer code parities that are output from the outer code encoder 139 are rearranged in the order of the inner code encoding. The resultant data is written again to an output area 250B that is different from the packing process area 250A of the main memory 160. A video shuffling portion 140 controls the addresses of the main memory 160 at which data that has been encoded with outer code is written so as to shuffle sync blocks.

In such a manner, block length data and overflow data are separated. The block length data is written to the first area 250A (as first packing process). The overflow data is packed to the memory of the outer code encoder 139 (as second packing process). The outer code parity is generated. The data and outer code parity are written to the second area 250B of the main memory 160. Those processes are performed for each ECC block. Since the outer code encoder 139 has a memory having the size of one ECC block, the access frequency against the main memory 160 can be decreased.

After a predetermined number of ECC blocks contained in one picture (for example, 32 ECC blocks) have been processed, the packing process and the outer code encoding process for one picture are completed. Data that is read from the area 250B of the main memory 160 is processed by an ID adding portion 148, an inner code encoder 147, and a synchronization adding portion 150. A parallel-serial converting portion 124 converts output data of the synchronization adding portion 150 into bit serial data. The output serial data is processed by a partial response class 4 precoder 125. When necessary, the output is digitally modulated. The resultant data is supplied to a rotating head disposed on the rotating drum 111.

A sync block that does not have valid data (this sync block is referred to as null sync) is placed in an ECC block so that ECC blocks can become flexible against the difference of formats of record video signals. A null sync is generated by the packing portion 137a of the packing and shuffling portion 137. The generated null sync is written to the main memory 160. Thus, since the null sync has a data record area, it can be used as a record sync for an overflow portion.

In the case of audio data, even number samples and odd number samples of audio data of one field form different ECC blocks. Since an ECC outer code sequence is composed of audio samples in the input order, whenever an audio sample of an outer code sequence is input, an outer code encoder 136 generates an outer code parity. A shuffling portion 147 controls the addresses of the audio data processing area 252 of the main memory 160 against an output of the outer code encoder 136 so as to shuffle it (in each channel and in each sync block).

In addition, a CPU interface 126 is disposed. The CPU interface 126 receives data from an external CPU 127 that functions as a system controller and designates parameters for the internal blocks. To handle a plurality of formats, the CPU interface 126 can designate many parameters such as sync block length, parity length.

"Packing length data" as a parameter is sent to the packing portions 137*a* and 137*b*. The packing portion 137*a* and 137*b* each pack VLC data in the fixed length (that is a length represented as "payload length" shown in FIG. 19A) designated corresponding to the parameter "packing length data".

"Number of packs data" as a parameter is sent to the packing portion 137*b*. The packing portion 137*b* designates the number of packs per sync block corresponding to the parameter "number of packs data". Data for the designated number of packs is supplied to the outer code encoder 139.

"Number of video outer code parities data" as a parameter is sent to the outer code encoder 139. The outer code encoder 139 encodes video data having parities corresponding to the parameter "number of video outer code parities data" with outer code.

"ID information" and "DID information" as parameters are sent to an ID adding portion 148. The ID adding portion 148 adds the ID information and the DID information to a data sequence having a unit length that is read from the main memory 160.

"Number of video inner code parities data" and "number of audio inner code parities data" as parameters are sent to the inner code encoder 149. The inner code encoder 149 encodes video data and audio data having parities corresponding to the parameters "number of video inner code parities data" and "number of audio inner code parities data" with inner code. In addition, "sync length data" as a parameter is sent to the inner code encoder 149. Thus, the unit length (sync length) of data that has been encoded with inner code is limited.

In addition, shuffling table data as a parameter is stored to a video shuffling table (RAM) 128*v* and an audio shuffling table (RAM) 128*a*. The shuffling table 128*v* performs an address conversion for the video shuffling portions 137*b* and 140. The shuffling table 128*a* performs an address conversion for the audio shuffling 137.

According to the embodiment of the present invention, when the MPEG encoder 102 encodes input video data into an MPEG bit stream, all frames are treated as I pictures and one GOP is composed of one I picture so that an editing operation can be performed for each frame. In addition, one slice is treated as one macro block. Moreover, the header of the sequence layer and the quantizing matrix are added to each of all frames. As a result, when an editing operation or a special reproducing operation (inversely reproducing operation, slow reproducing operation, or high speed reproducing operation) is performed, even if the chronological relation of frames of a stream recorded on a tape is changed, the encoding syntax of MPEG can be prevented from being unsatisfied.

In addition, according to the embodiment, an MPEG bit stream may be input from the SDTI receiving portion 108. In this case, unlike with the encoding of the MPEG encoder 102, even if the encoding syntax of MPEG is satisfied, it is not assured that the header of the sequence layer and the quantizing matrix may are always added to each of all frames. To solve such a problem, according to the embodiment, when the header of the sequence layer is not added to each frame, the record side MFC 106 performs an interpolating process for interpolating the header of the sequence layer. Likewise, the record side MFC 106 performs an interpolating process for the quantizing matrix.

Figure 23:
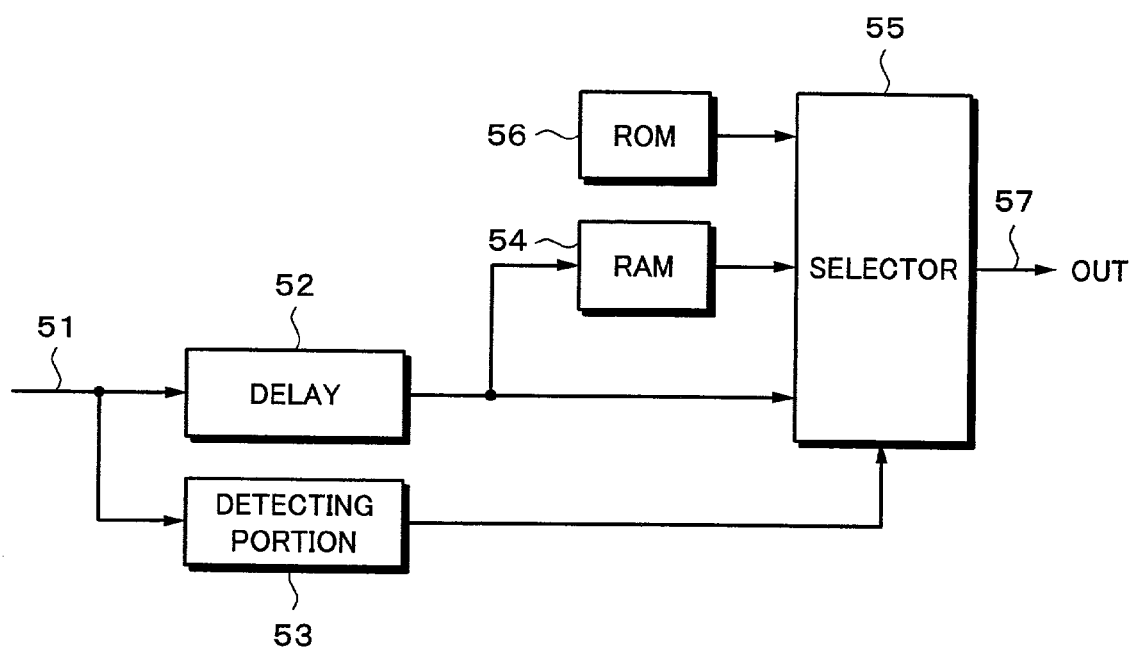
FIG. 23 is a block diagram showing an interpolating portion for the header of the sequence layer according to the embodiment of the present invention.

FIG. 23 shows an example of an interpolating portion that interpolates the header of the sequence layer. Reference numeral 51 represents an MPEG bit stream that is input from the SDTI receiving portion 108. Since the header of the sequence layer is added to each frame, it is not necessary to cause the interpolating portion to interpolate a stream that is output from the MPEG encoder 102. The input stream 51 is supplied to a delay portion 52 and a detecting portion 53. The delay portion 52 generates a delay equivalent to a time period for the detecting process performed by the detecting portion 53. An output of the delay portion 52 is supplied to a RAM 54 and a selector 55. The header of the sequence layer of the bit stream is written to the RAM 54. An output that is read from the RAM 54 is supplied to the selector 55.

The interpolating portion further comprises a ROM 56. The ROM 56 pre-stores information of the header of the sequence layer corresponding to the model of the digital VTR. For example, the header of the sequence layer corresponding to the format of the video data handled by the model is pre-written to the ROM 56. In this case, the headers of the sequence layers of a plurality of types may be pre-written to the ROM 56. The header of the sequence layer selected corresponding to a user's designation may be read from the ROM 56. The header that is read from the ROM 56 is supplied to the selector 55. The selecting operation of the selector 55 is controlled corresponding to an output of the detecting portion 53.

When the stream that is output from the delay portion 52 contains the header of the sequence layer, the selector 55 selects as an output stream 57 the stream of which the header of the sequence layer has been added to each frame (picture). When the stream does not contain the header of the sequence layer, the header of the sequence layer stored in the RAM 54 or the ROM 56 is added to each frame of the stream. Thus, the stream of which the header has been added to each frame is output. In this case, the header of the sequence layer stored in the RAM 54 is added to each frame with higher priority than the header of the sequence layer stored in the ROM 56.

The interpolating portion further comprises a controlling portion (not shown). The controlling portion controls the structure shown in FIG. 23. Although FIG. 23 shows the structure of hardware, part of the functions of the block may be processed by software. Alternatively, all the functions of the block may be processed by software.

Figure 24:
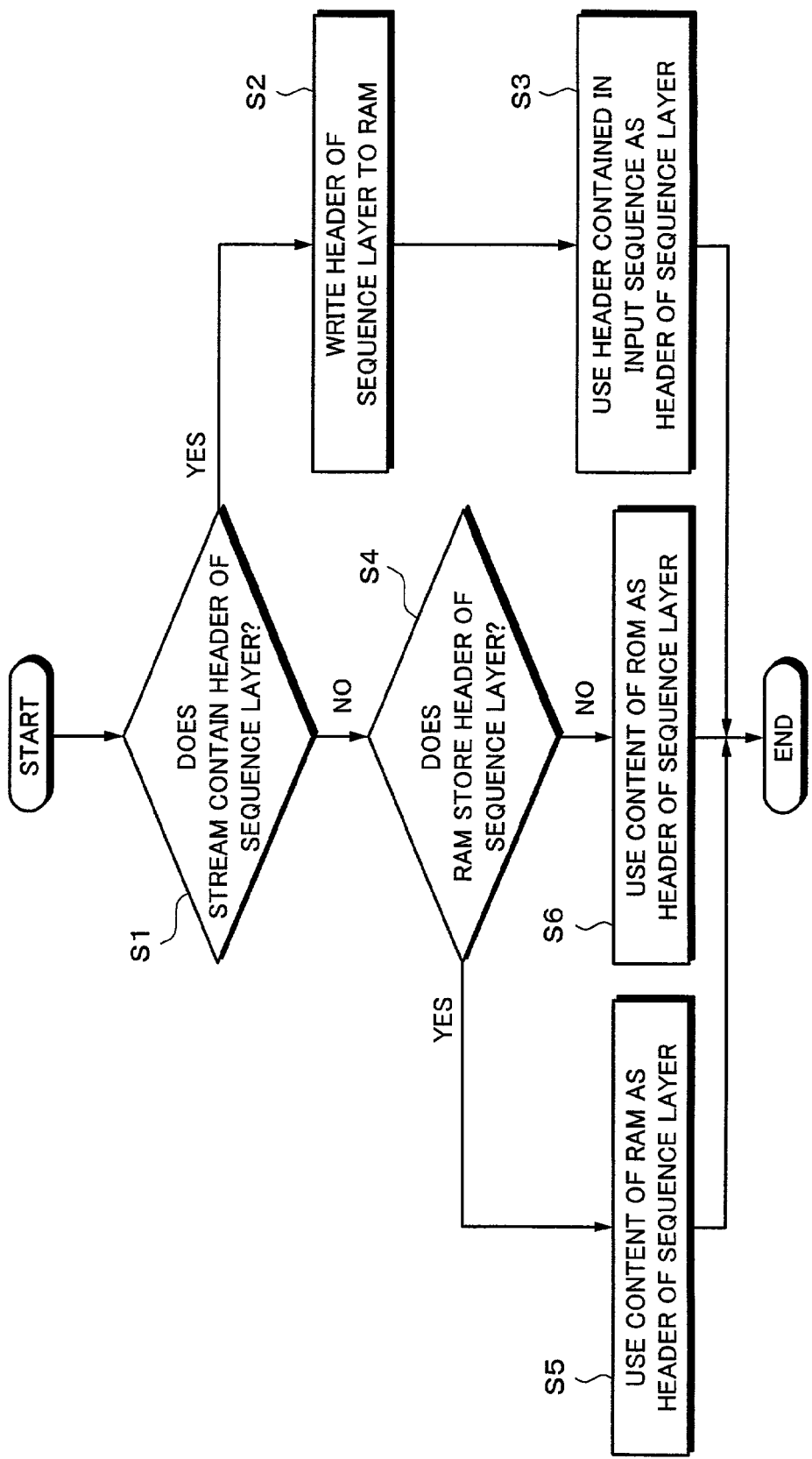
FIG. 24 is a flow chart for explaining an interpolating process.

FIG. 24 is a flow chart showing the detecting process of the detecting portion 53 and the controlling process corresponding to the detected result. At step S1, it is determined whether or not the input stream 51 contains the header of the sequence layer. In the following description, it is determined whether or not the input stream contains the header. However, in addition, it is preferred to determine whether or not the header of the sequence layer satisfies the encoding syntax of MPEG. When the input stream contains the header, the flow advances to step S2. At step S2, the header of the sequence layer contained in the stream is written to the RAM 54. In the RAM 54, the header of the new sequence layer is overwritten to the header of the old sequence layer. The header of the sequence layer contained in the input stream is added as the header of the sequence layer to each frame (at step S3).

When the determined result at step S1 represents that the input stream does not contain the header of the sequence layer, the flow advances to step S4. At step S4, it is determined whether or not the RAM 54 stores the header of the sequence layer. When the RAM 54 stores the header of the sequence layer, the flow advances to step S5. At step S5, the content stored in the RAM 54 is added as the header of the sequence layer to each frame. When the determined result at step S4 represents that the RAM 54 does not store the header of the sequence layer, the flow advances to step S6. At step S6, the content stored in the ROM 56 is added as the header of the sequence layer to each frame. Just after the power of the apparatus is turned on, the header of the sequence layer is not stored in the RAM 54.

In the above-described process, the header of the sequence layer has been added to each frame of the output stream of the selector 55. In the above example, the header of the sequence layer was described. Likewise, the quantizing matrix can be interpolated in the same manner as the above. Thus, the quantizing matrix can be always added to each frame of the output stream.

In the above example, it was stated that the present invention is applied to a digital VTR that records MPEG and JPEG data streams. In addition, the present invention can be applied to a compression encoding having a hierarchical structure different from MPEG and JPEG. In the case, the header of the highest hierarchical level equivalent to the header of the sequence layer is added to each frame.

In addition, the present invention can be applied to record mediums other than a magnetic tape. As long as a data stream is directly recorded, the present invention can be applied to disc shaped record mediums such as a hard disc and a DVD (Digital Versatile Disc) and a RAM recorder using a semiconductor memory as a record medium.

As was described above, according to the present invention, since an editing process is performed for each frame, a bit stream can be prevented from being unsatisfied with the encoding syntax. In addition, according to the present invention, unlike with the case that the sequence layer is recorded at only a predetermined position such as the beginning of a tape, the tape can be normally reproduced from any position. Moreover, according to the present invention, when a special reproducing operation such as high speed reproducing operation, slow reproducing operation, or inversely reproducing operation is performed, the header of the sequence layer or the quantizing matrix can be securely obtained.

DESCRIPTION OF REFERENCE NUMERALS

1 SEQUENCE HEADER CODE
2 SEQUENCE HEADER
3 SEQUENCE EXTENSION
4 EXTENSION AND USER DATA
5 GOP START CODE
8 PICTURE START CODE
12 SLICE START CODE
14 MACRO BLOCK HEADER
101 SDI RECEIVING PORTION
102 MPEG ENCODER
106 RECORD SIDE MULTI FORMAT CONVERTER (MFC)
108 SDTI RECEIVING PORTION
109 ECC ENCODER
112 MAGNETIC TAPE
113 ECC DECODER
114 REPRODUCTION SIDE MFC
115 SDTI OUTPUT PORTION
116 MPEG DECODER
118 SDI OUTPUT PORTION
137A, 137C PACKING PORTION
137B VIDEO SHUFFLING PORTION
139 OUTER CODE ENCODER
140 VIDEO SHUFFLING
149 INNER CODE ENCODER

The invention claimed is:

1. A recording apparatus for compression-encoding a digital video signal, generating a bit stream having a hierarchical structure composed of a plurality of hierarchical levels, and recording the bit stream to a record medium, comprising:
   encoding means for intra-frame encoding all the digital video signal so as to compress the digital video signal;
   adding means for adding a header of the highest hierarchical level to the bit stream of each frame;
   determining means for determining whether the header of the highest hierarchical level is absent or an inconsistency of encoding syntax takes place;
   storing means for storing the latest header of the highest hierarchical level, and
   wherein when the determined result of said determining means represents that, the header of the highest hierarchical level is absent or abnormal, said adding means adds the latest header of the highest hierarchical level stored in said storing means to the bit stream of each frame; and
   recording means for recording the bit stream to which the header of the highest hierarchical level has been added to the record medium.

2. The recording apparatus according to claim 1, wherein the record medium comprises a tape-shaped record medium.

3. A recording apparatus for compression-encoding a digital video signal, generating a bit stream having a hierarchical structure composed of a plurality of hierarchical levels, and recording the bit stream to a record medium, comprising:
   encoding means for intra-frame encoding all the digital video signal so as to compress the digital video signal;
   adding means for adding a header of the highest hierarchical level to the bit stream of each frame;
   determining means for determining whether the header of the highest hierarchical level is absent or abnormal; and
   storing means for storing a prepared header of the highest hierarchical level, and wherein when the determined result of said determining means represents that the header of the highest hierarchical level is absent or an inconsistent of encoding syntax takes place, said adding means adds the prepared header of the highest hierarchical level stored in said storing means to the bit stream of each frame.

4. A recording apparatus for compression-encoding a digital video signal, generating a bit stream having a hierarchical structure composed of a plurality of hierarchical levels and recording the bit stream to a record medium, comprising:
   encoding means for intra-frame encoding all the digital video signal so as to compress the digital video signal;
   adding means for adding a quantizing matrix to the bit stream of each frame;
   determining means for determining whether the quantizing matrix is absent or abnormal;
   storing means for storing the latest quantizing matrix,
   wherein when the determined result of said determining means represents that the quantizing matrix is absent or abnormal, said adding means adds the latest quantizing matrix stored in said storing means to the bit stream of each frame; and recording means for recording the bit stream to which the quantizing matrix has been added to the record medium.

5. The recording apparatus according to claim 4, wherein the record medium comprises a tape-shaped record medium.

6. A recording apparatus for compression-encoding a digital video signal, generating a bit stream having a hierarchical structure composed of a plurality of hierarchical levels and recording the bit stream to a record medium, comprising:

encoding means for intra-frame encoding all the digital video signal so as to compress the digital video signal;

adding means for adding a quantizing matrix to the bit stream of each frame;

determining means for determining whether the quantizing matrix is absent or abnormal; and storing means for storing a prepared quantizing matrix, and wherein when the determined result of said determining means represents that the quantizing matrix is absent or abnormal, said adding means adds the prepared quantizing matrix stored in said storing means to the bit stream of each frame.

\* \* \* \* \*